(12) United States Patent
Iwama et al.

(10) Patent No.: US 8,460,827 B2
(45) Date of Patent: Jun. 11, 2013

(54) RECHARGEABLE BATTERY, ANODE, AND CURRENT COLLECTOR

(75) Inventors: Masayuki Iwama, Fukushima (JP); Kenichi Kawase, Fukushima (JP); Takakazu Hirose, Fukushima (JP)

(73) Assignee: Sony Corporation, Tokyo (JP)

( * ) Notice: Subject to any disclaimer, the term of this patent is extended or adjusted under 35 U.S.C. 154(b) by 564 days.

(21) Appl. No.: 12/712,829

(22) Filed: Feb. 25, 2010

(65) Prior Publication Data

US 2010/0233534 A1 Sep. 16, 2010

(30) Foreign Application Priority Data

Mar. 10, 2009 (JP) ................. 2009-056457

(51) Int. Cl.
*H01M 4/66* (2006.01)
*H01M 4/70* (2006.01)

(52) U.S. Cl.
USPC ............ 429/233; 429/232; 429/235; 429/245

(58) Field of Classification Search
None
See application file for complete search history.

(56) References Cited

U.S. PATENT DOCUMENTS

| | | | |
|---|---|---|---|
| 7,147,971 B2 | 12/2006 | Okamoto et al. | |
| 7,226,700 B2 | 6/2007 | Takada et al. | |
| 7,476,464 B2 | 1/2009 | Hirose et al. | |
| 2004/0106042 A1* | 6/2004 | Asari et al. | 429/232 |
| 2009/0061326 A1* | 3/2009 | Hirose et al. | 429/338 |

FOREIGN PATENT DOCUMENTS

| | | | |
|---|---|---|---|
| JP | 2000-100475 | | 4/2000 |
| JP | 2002-319407 | | 10/2002 |
| JP | 2002-319408 | | 10/2002 |
| JP | 2004-207112 | | 7/2004 |
| JP | 2007-103197 | | 4/2007 |
| JP | 2008-041307 | | 2/2008 |
| JP | 2009-004370 | * | 1/2009 |

* cited by examiner

*Primary Examiner* — Jonathan Crepeau
(74) *Attorney, Agent, or Firm* — Dentons US LLP

(57) ABSTRACT

A rechargeable battery including a cathode and an anode each capable of inserting and extracting an electrode reaction material, and including an electrolyte, in which the anode includes an anode current collector which is formed by including a current collector body. The anode current collector is provided thereon with an active anode material layer, and a plurality of conductive particles disposed on the surface of the current collector body with the surface facing the active anode material layer. The plurality of conductive particles is formed to include spherical particles and plate-like particles. Since a tridimensional structure having irregularities is formed on the surface of the current collector body with the spherical particles and plate-like particles, anchoring effects are greatly increased. As a result, the adhesion of the active anode material layer to the anode current collector is considerably improved.

13 Claims, 11 Drawing Sheets

RECHARGEABLE BATTERY, ANODE, AND CURRENT COLLECTOR

BACKGROUND OF THE INVENTION

1. Field of the Invention

The invention relates generally to current collectors, anodes, and rechargeable batteries. More particularly, the invention provides a current collector for use in electrochemical devices, and an anode and a rechargeable battery each including the current collector.

2. Description of the Related Art

With the recent trend of widespread use of portable electric devices such as video camera, digital still camera, cellular phone, notebook computer, and so forth, the miniaturization, weight reduction, and extended life, of these devices have been eagerly desired. In order to meet the demands for electronics applications, the development of batteries, and of rechargeable batteries, in particular, has been actively pursued as to satisfactory power sources that are feasible of achieving the miniaturization, lighter-weight, and higher energy density.

Among others, rechargeable lithium-ion batteries, which utilize the insertion and extraction of lithium ions during charge-discharge reaction, have been met with a high degree of expectation. This is for the reason of its energy density higher than the density obtained with lead battery or nickel-cadmium battery.

The rechargeable lithium-ion battery is formed by including a cathode and an anode, and also an electrolyte. The anode is provided with an active anode material layer, and this active anode material layer is formed to include active anode material which is capable of participating in the charge-discharge reaction.

As the active anode material, carbon containing materials have been widely used. However, since further improvement in battery capacity is desired recently in response to the requirements for higher performance and expanded functionality of portable electric devices, silicon materials have been investigated. This is because the theoretical capacity (4199 mAh/g) of silicon is markedly higher than that of graphite (372 mAh/g), and a large improvement in the battery capacity can therefore be expected from silicon. In this regard, other than the single silicon element, several compounds and alloys of silicon have also been investigated.

When silicon is used as the active anode material, however, the layer of active anode material either expands or contracts severely, resulting in the deformation of the current collector, and possibly in the damage or separation of the active anode material layer. As a result, it becomes for the cycle characteristic, as one of the important properties of the rechargeable battery, to be deteriorated with relative ease.

Incidentally, numerous investigations on rechargeable lithium-ion batteries have been carried out to improve various performances. To be more specific, for example, in order to realize a battery system of sealed-type being formed with low magnetic susceptibility materials, an anode current collector is used by having a screen-shape formed by chemical etching process (see, Japanese Unexamined Patent Application Publication No. 2000-100475, for example). As another example, in order to improve charge-discharge cycle characteristics by increasing the adhesion of a current collector and a thin active material layer, a metal foil, which is anticorrosion processed with a chromium containing layer, is employed as an anode current collector (see, Japanese Unexamined Patent Application Publication No. 2002-319407, for example). In this case, after copper grain powders are plated, a copper foil is also employed as an anode current collector, which is provided thereon with a dense copper layer formed by plating process so as not to damage an irregular structure formed previously with the grain powders (see, Japanese Unexamined Patent Application Publication No. 2002-319408, for example). As still another example, in order to improve cycle characteristics without increasing the thickness of anode current collector, an anode current collector, which is provided thereon with protrusions, is used (see, Japanese Unexamined Patent Application Publications No. 2004-207112, 2007-103197, and 2008-41307, for example).

SUMMARY OF THE INVENTION

Along with recent, ever growing requirements for higher performance and expanded functionality of portable electric devices, the power consumption tends to increase in recent years, charge-discharge cycles of the rechargeable battery are repeated more frequently, and its cycle characteristics tend to degrade with more ease. Therefore, further improvements of the cycle characteristics of rechargeable battery are highly desirable.

In view of the abovementioned and other difficulties, it is desirable to provide a rechargeable battery, anode, current collector that are feasible to improve cycle characteristics for the battery.

According to an embodiment of the invention, a current collector is provided by including a plurality of conductive particles disposed on the surface of a current collector body, and the plurality of conductive particles includes spherical particles and plate-like particles. An anode is also provided according to an embodiment of the invention by including an anode current collector, and an active anode material layer formed on the anode current collector, in which the anode current collector has the same structure as the abovementioned current collector according to an embodiment of the invention. A rechargeable battery is also provided by including a cathode capable of inserting and extracting an electrode reaction material, an anode capable of extracting and inserting the electrode reaction material, and an electrolyte, in which the anode has the same structure as the abovementioned anode according to an embodiment of the invention.

With the current collector according to an embodiment of the invention, the current collector body included in the current collector is provided with the plurality of conductive particles disposed on the surface thereof, and the plurality of conductive particles includes the spherical particles and the plate-like particles. Since a tridimensional structure having complex shape (irregularities) is formed on the surface of the current collector body with the spherical particles and plate-like particles, anchoring effects are greatly increased. As a result, in the anode including the current collector of the invention, the adhesion of an active anode material layer to the anode current collector is considerably improved. Therefore, with the rechargeable battery including the abovementioned anode of the invention, cycle characteristics can be improved, since the deformation, damage, and so forth of the anode current collector are suppressed.

DESCRIPTION OF THE PREFERRED EMBODIMENTS

Figure 1:
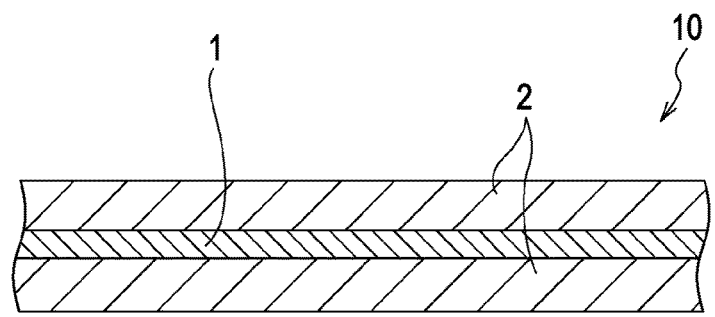
FIG. 1 is a section view schematically illustrating an anode using a current collector according to an embodiment of the invention.

Referring now to the drawings, preferred embodiments of the present invention will be detailed hereinbelow. The description of the embodiments is presented in the order as follows.

1. Anode using current collector.
2. Electrochemical device (rechargeable battery) using current collector and anode.
   2-1. First rechargeable battery (cylinder type).
   2-2. Second rechargeable battery (laminate film type).

<1. Anode Using Current Collector>

Figure 2:
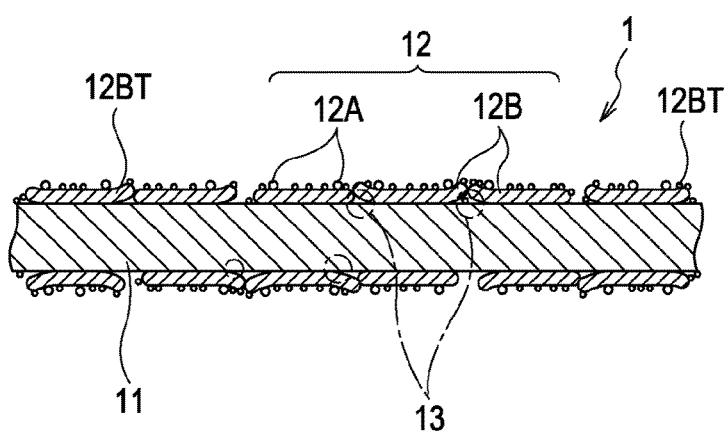
FIG. 2 is a section view showing an enlarged side view of the structure of the anode current collector of FIG. 1.

FIGS. 1 and 2 are section views schematically illustrating an anode using a current collector according to an embodiment of the invention. FIG. 1 shows an overall side view of the anode 10, while FIG. 2 shows an enlarged side view of the structure of anode current collector 1 shown in FIG. 1.

[Overall Structure of Anode]

The anode 10 is for use in electrochemistry devices such as rechargeable batteries, and provided with a layer of active anode material (which is hereinafter referred to as active anode material layer 2) formed on the current collector (anode current collector 1), as shown in FIG. 1. In addition, the active anode material layer 2 may be formed either on only one side of, or on both sides of the anode current collector 1.

[Anode Current Collector]

The anode current collector 1 is formed, as shown in FIG. 2, including a current collector body 11 provided on the surface thereof with a first plurality of conductive particles 12. The surface of anode current collector 1 is therefore formed as a roughened surface. This is useful for the reason that, because of the so-called anchoring effect, the adhesion of active anode material layer 2 to anode current collector 1 is improved.

Although the surface roughness (ten point height average of irregularities Rz) of anode current collector 1 is not specifically limited herein, it is preferred to be as large as possible. This is for the reason of the increase in the adhesion of active anode material layer 2 to anode current collector 1. In this regard, if the ten point height average of irregularities Rz is too large, the adhesion of the active anode material layer 2 may be adversely affected to decrease. Therefore, the ten point height average of irregularities Rz for the layer is preferably in the range from 2.5 to 8.5 μm, for example.

Although tensile strength of the anode current collector 1 is not specifically limited, it is preferred to be as large as possible, and preferably to be 400 N/mm$^2$ or larger, for example. This is for the reason that the anode 10 becomes hardly deformed or damaged during electrode reactions since the physical strength increases for the anode 10.

The current collector body 11 is formed with materials which are endowed with excellent electrochemical stability, electrical conductivity, and mechanical strength. As such materials, preferably adopted are the materials which contain metal elements as constituent elements, including either single entity of the metal elements or the combination thereof as alloy or compound, or stainless steel. As the metal elements, copper (Cu), nickel (nickel), and so forth may preferably be cited, and copper is preferred in particular among these elements. This is for the reason of its excellent electrical conductivity.

The current collector body 11 is formed with a metal foil, for example. This metal foil may be used in the form of either non-roughened foil yet to be roughened or roughened foil already roughening processed. A rolled foil may be cited as the non-roughened foil, for example. As the roughened foil, an electrolytic foil or and sandblasted foil is cited, for example. The electrolytic foil is the foil which is formed with a foil base (such as rolled foil, for example) provided with particulates (concavoconvex or irregularities) formed on the surface thereof by electrolytic process, for example. The sandblasted foil is the foil which is formed with a foil base provided with irregularities formed on the surface thereof by sandblast process. Particularly, a roughened foil is preferably used and an electrolytic copper foil is more preferred. This is for the reason that the surface roughness of the anode current collector 1 increases with increasing surface roughness (ten point height average of irregularities Rz) of the current collector body 11, and, as a result, the adhesion of active anode material layer 2 to the anode current collector 1 increases. Accordingly, although the surface roughness of current collector body 11 is not specifically limited, it is preferable to be as large as possible.

In addition, it is preferred for the current collector body 11 to be formed by including carbon and sulfur as constituent elements. This is for the reason of improved physical strength of the current collector body 11. Although the content of carbon and sulfur in the current collector body 11 is not specifically limited, it is desirable that the content is preferably 100 ppm or less for each element. This is for the reason of the large physical strength obtained with the elements while maintaining sufficient electrical conductivity.

Although the mean diameter of crystallites included in the current collector body 11 is not specifically limited, in which the mean diameter is obtained from the X-ray diffraction method, it is preferred among others to be in the range from 0.1 to 5 μm. This is for the reason of improved physical strength of the current collector body 11.

The first plurality of conductive particles 12 is disposed on the surface of the current collector body 11 on the side thereof facing the active anode material layer 2. Referring to FIG. 2, the first plurality of conductive particles 12 includes a second plurality of spherical particles 12A and a third plurality of plate-like particles 12B. As shown in FIG. 2, since a tridimensional structure having complex shape (irregularities) is formed on the surface of the current collector body 11 with two kinds of particles (spherical particles 12A and plate-like particles 12B) different with each other considerably in appearance configuration, this gives rise to increased anchoring effects. As a result, the adhesion of active anode material layer 2 to anode current collector 1 is greatly increased. In addition, although the number of spherical particles 12A and plate-like particles 12B is not specifically limited, it is preferable to be as large as possible. This is for the reason that, with thus provided spherical particles 12A and plate-like particles 12B, the tridimensional structure having complicated shape can be formed with more ease, and in addition, the shape of the tridimensional structure becomes more complicated.

Figure 5A:
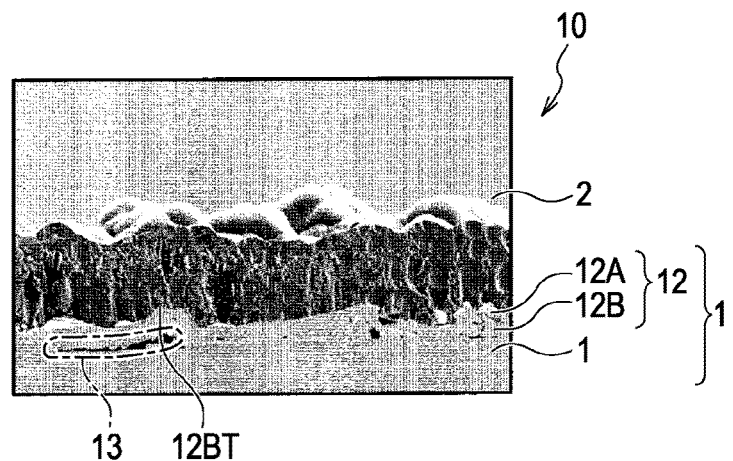
FIG. 5A shows a SEM photograph illustrating the cross-sectional structure of the anode current collector according to an embodiment of the invention.
Figure 5B:
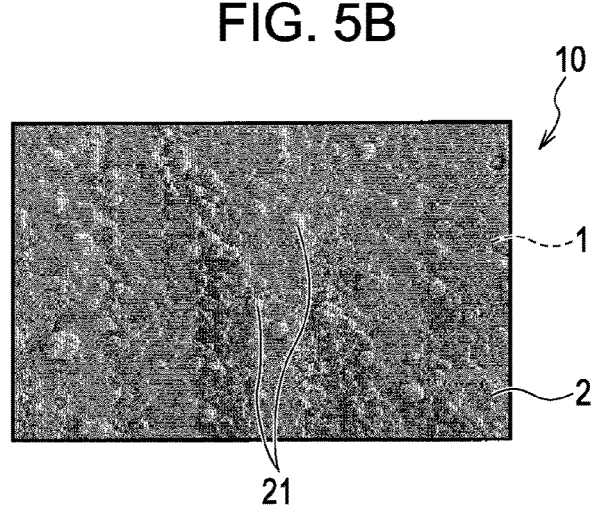
FIG. 5B shows a SEM photograph illustrating the surface structure of the anode current collector corresponding to FIG. 5A according to an embodiment of the invention.

In addition, it can be ascertained whether the spherical particles 12A and plate-like particles 12B are included, by observing the surface or the section of anode current collector 1 using a scanning electron microscope (SEM) and so forth, for example. By the "surface" of anode current collector 1, it is meant the surface on the side of forming the active anode material layer 2 (with reference to FIGS. 3A and 3B and so forth as described later on); while by the "section" meant is the section in the direction intersecting with the surface of anode current collector 1 (with reference to FIG. 5A as also described later on). The definition of the "surface" and "section" is the same in the description which follows.

In the case where the respective numbers of spherical particles 12A and plate-like particles 12B are each plural, these particles are piled up at random on the surface of the current collector body 11. As a result, the way of arranging the spherical particles 12A and plate-like particles 12B is not limited specifically. In addition, FIG. 2 illustrates only the portion of the spherical particles 12A and the plate-like particles 12B located on the outermost surface of anode current collector 1.

The second plurality of spherical particles 12A are formed each having nearly spherical outer shape. By "nearly spherical" is meant that, when the surface or the section of anode current collector 1 is observed using SEM and so forth, the spherical particles are observed with a round shape (profile) to such a degree distinguishable from the third plurality of plate-like particles 12B. In addition to the shape with a circular profile, the nearly spherical outer shape includes one with elliptical profile, and others with deformed circular or elliptical profile.

In the case where the plurality of spherical particles 12A and of plate-like particles 12B are piled up, the spherical particles 12A may be disposed either on the surface of current collector body 11, underneath the plate-like particle 12B, between the plurality of plate-like particles 12B, or on top of the plate-like particle 12B. However, as realized when the surface of anode current collector 1 is observed using SEM and so forth, at least some of the spherical particles 12A have to be found overlying the plate-like particle 12B.

Although the mean particle size of spherical particles 12A is not specifically limited, it is preferable to be as small as possible. This is for the reason that, with the increase of the ten point height average of irregularities Rz for the anode current collector 1, the surface area thereof increases, and the adhesion of active anode material layer 2 to the anode current collector 1 is further improved, as a result. In this regard, if the mean particle size becomes too small, the ten point height average of irregularities Rz may be adversely affected to decrease for the anode current collector 1. Therefore, the mean particle size is preferably in the range from 1 to 10 μm, for example. In addition, when the spherical particle has the elliptical profile and so forth, the mean particle size means an average maximum particle diameter (maximum particle diameter along the long axis of the particle). In addition, the "particle size" referred to in this invention is expressed all in terms of the median size.

The third plurality of plate-like particles 12B are formed each having nearly plate-like outer shape. By "nearly plate-like" is meant that, when the surface or the section of anode current collector 1 is observed using SEM and so forth, the plate-like particles are observed with a crushed flat shape to such a degree distinguishable from the spherical particles 12A. As long as the particles have the nearly plate-like outer shape, the planar shape of plate-like particles 12B (the shape of plate-like particles 12B viewed from the side of active anode material layer 2) is not specifically limited.

The plurality of plate-like particles 12B is preferably formed by being extended in the direction along the surface of the current collector body 11. By "extended in the direction along the surface of the current collector body 11", it is meant that the angle between the direction of the extension of plate-like particles 12B and the surface of current collector body 11 is 45° or smaller. In this case, the plate-like particles 12B are formed preferably being bent in the section of the anode current collector 1 such that the end portion 12BT thereof in the direction of extension moves away (becomes more distant) from the surface of the current collector body 11. This is for the reason that the active anode material layer 2 becomes hardly expanded or contracted during electrode reactions, since the space for releasing stress (gap 13) is formed underside of the end portion 12BT (on the side close to the current collector body 11). Since the volume of the gap 13 becomes considerably larger than that of gaps formed between the plurality of spherical particles 12A and so forth, the stress generated in the active anode material layer 2 during electrode reactions is remarkably released by the gap 13. In addition, when the plurality of plate-like particles 12B are present, some of, or all of the plate-like particles 12B may be the plate-like particles 12B which have been formed by being bent, as mentioned just above. In addition, the bent portion out of the end portion 12BT of the plate-like particle 12B may be on either both sides of, or one side of the particle. This is for the reason that it is possible for the gap 13 to be formed as long as either some of plate-like particles 12B are, or at least one of the end portions 12BT is bent.

When the plurality of plate-like particles 12B is present, these plate-like particles 12B are preferably formed at least partially overlapped with each other on the surface of anode current collector 1. This is the reason that the electrical conductivity of anode current collector 1 is increased since the plate-like particles 12B are electrically interconnected.

Although the mean particle size (maximum particle diameter along the long axis of the particle) of plate-like particles 12B is not specifically limited, it is preferable to be as large as possible. This is for the reason of further improvement of the adhesion of active anode material layer 2 to the anode current collector 1 with increasing the ten point height average of irregularities Rz of the anode current collector 1. In this regard, if the mean particle size becomes too large, the ten point height average of irregularities Rz of anode current collector 1 may be adversely affected to decrease. Therefore, the mean particle size is preferably 50 μm or smaller, for example.

Although the size (length of its long axis) of plate-like particles 12B, in the direction of the extension, is not specifically limited, it is preferable to be as large as possible. This is for the reason of the formation with more ease of the tridimensional structure having complex shapes with the spherical particles 12A and plate-like particles 12B. However, if the length becomes too large, the tridimensional structure may be adversely affected to simplify itself and the surface of the anode current collector 1 may approach to be flat, as a result. Therefore, the size ratio L/T in the section of the anode current collector 1 is preferably in the range from 1 to 30, for example, where L is the size (the length of long axis) and T is the length of short axis (thickness) of the plate-like particle 12B.

The spherical particles 12A and plate-like particles 12B may be formed with either the same material as, or the material different from, the current collector body 11. In this case, between the spherical particle 12A and plate-like particle 12B, the constituent materials may either coincide with, or differ from, each other. Particularly, it is preferred for the spherical particle 12A and plate-like particle 12B to be the particles (metal particles) each including metal elements similar to those included in the current collector body 11. This is for the reason of further improvement of the adhesion of the spherical particle 12A and plate-like particle 12B to the current collector body 11.

In addition, the spherical particle 12A and plate-like particle 12B may be formed through either single process or different individual processes. Particularly, it is preferable through the single process by the spraying method. This is for the reason that spherical particle 12A and plate-like particle 12B, which are different in outer appearance with each other, can be formed collectively with ease and their shapes can be controlled with ease as well. When the spraying method is used, a molten material (melt of constituent materials for forming the spherical particle 12A and plate-like particle 12B) is sprayed onto the surface of the current collector body 11 and both spherical particles 12A and plate-like particles 12B are formed. In this case, it is considered that the melts primarily having relatively small particle size are fixed as-is onto the surface of the current collector body 11 to form the spherical particles 12A, while the melts having with relatively large particle size are crushed on the surface of the current collector body 11 to subsequently form the plate-like particles 12B.

Particularly, it is preferred for oxides to be formed on the surface of spherical particles 12A and plate-like particles 12B. This is for the reason of the increase of anchoring effects. For the spherical particles 12A and plate-like particles 12B formed of metal particles, the above-mentioned oxides are metal oxides. In the case where the spherical particles 12A and plate-like particles 12B are formed using the spraying method, the metal oxides undergo fibrous growth, for example. It can be ascertained whether the metal oxides are formed, by observing the surface of anode current collector 1 using SEM and so forth, for example. In addition, it can be ascertained alternatively by carrying out the elemental analysis by means of the energy dispersive X-ray fluorescence spectroscopy (EDX). It may be cited as an example, when the spherical particles 12A and plate-like particles 12B are copper particles, that copper oxides are formed on the surfaces of these particles.

[Active Anode Material Layer]

The active anode material layer 2 is formed by including either one kind of, or two or more kinds of anode substances as the active anode material which is capable of inserting or extracting electrode reaction materials such as lithium ions, for example. In addition, the active anode material layer 2 may include additional materials such as an anode conductive agent or an anode binder agent, in addition to the abovementioned active anode material, where relevant. The details of the anode conductive agent and anode binder agent are similar to those of a cathode conductive agent and cathode binder agent, for example, which will be described later on.

As the anode substance, preferably cited is a material including at least one kind selected from the group including metal elements and metalloid elements (metal series material), as its constituent. This is for the reason of high energy density obtained with the material. The metal series material may include either a simple substance of the metal elements or metalloid elements, or the combination thereof as alloy or compound, such that each may be included at least partially in one kind of, or two or more kinds of phases.

As the metal elements and metalloid elements, there cited are preferably metal elements and metalloid elements, which are capable of forming alloys in combination with the electrode reaction material. Specific examples of the metal elements may include at least one element selected from the following group of the element including magnesium (Mg), boron (B), aluminum (Al), gallium (Ga), indium (In), germanium (Ge), tin (Sn), silicon (Si), and lead (Pb). Also included in the group are bismuth (Bi), cadmium (Cd), silver (Ag), zinc (Zn), hafnium (Hf), zirconium (Zr), yttrium (Y), palladium (Pd), and platinum (Pt). Particularly, silicon or tin is preferred, and silicon is more preferred. This is for the reason of high energy density obtained with these materials.

The material containing silicon (silicon containing material) may include either a simple substance of silicon, or the combination with silicon as alloy or compound, such that each may be included at least partially in one kind of, or two or more kinds of phases. As to the alloy of silicon, at least one of the following elements may be cited, for example, as the constituent element other than silicon for forming the alloy: tin, nickel, copper, iron (Fe), cobalt (Co), manganese (Mn), zinc, indium, silver, titanium (Ti), germanium, bismuth, antimony (Sb), and chromium (Cr). As the compound of silicon, there may be cited ones containing oxygen (O) or carbon (C) as the constituent element other than silicon, for example. In addition, the silicon compound may include, as constituent elements other than silicon, one kind of, or one or more kinds of, the elements selected from the group mentioned above for forming the silicon alloy. Examples of the silicon alloy and silicon compound include, but not limited to, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$ and $TaSi_2$. The examples of the alloy and compound further include $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), and LiSiO.

The material containing tin element (tin containing material) may include either a simple substance of tin, or the combination with tin as alloy or compound, such that each may be included at least partially in one kind of, or two or more kinds of phases. As to the alloy of tin, at least one of the following elements may be cited, for example, as the constituent element other than tin for forming the alloy: silicon, nickel, copper, iron, cobalt, manganese, zinc, indium, silver, titanium, germanium, bismuth, antimony, and chromium. As the compound of tin, there may be cited ones containing oxygen or carbon as the constituent element other than tin for forming the compound. In addition, as constituent elements other than tin, the tin compound may include one kind of, or one or more kinds of, the elements selected from the group cited above for forming the tin alloy. Examples of the tin alloy and tin compound include, but not limited to, $SnSiO_3$, LiSnO, and $Mg_2Sn$.

Particularly, the tin containing material may preferably be formed, for example, including tin as a primary constituent element, and further including secondary constituent elements and ternary constituent elements. This is for the reason of high energy densities stably obtained with the composition. The secondary constituent element is at least one element selected from the group including cobalt, iron, magnesium, titanium, vanadium, chromium, manganese, nickel, copper, zinc, gallium, and zirconium. Also included in the group are niobium, molybdenum, silver, indium, cerium (Ce), hafnium, tantalum, tungsten, bismuth, and silicon. The ternary constituent element is at least one of boron, carbon, aluminum, and phosphorus, for example.

In particular, there preferred is SnCoC containing material, which is formed as the material containing tin, cobalt, and carbon, having the carbon content ranging from 9.9% to 29.7% by mass, and having the proportion of tin and Co contents (Co/(Sn+Co)) ranging from 20% to 70% by mass, as well. This material is preferred for the reason of high energy densities obtained with the compositional range mentioned just above.

The SnCoC containing material is formed by having the phase simultaneously including tin, cobalt, and carbon, and this phase preferably corresponds to either low crystallinity or amorphous state. This phase is formed as a reaction phase which is capable of reacting with the electrode reaction material, and with the presence of the reaction phase, excellent battery characteristics can be realized. Also with regard to the reaction phase, the peak width at half height, or half width, of diffraction peak obtained by the X-ray diffraction method for this phase is preferably 1.0° or larger with respect to diffraction angle 2θ when observed using CuKα characteristic X-ray line and at an angular scanning speed of 1°/min. This result is noted with the present material in such phase as observed as above, for the reason that the electrode reaction substance is inserted or extracted more easily, and that the reaction of the material with the electrolyte and other materials decreases. In addition, the SnCoC containing material may also be formed in some occasion, containing the phase which is formed by including single entity of, or a portion of, the constituent elements, in addition to the abovementioned low crystallinity or amorphous phase.

It can be determined with relative ease whether the diffraction peak obtained by the X-ray diffraction method corresponds to the reaction phase capable of reacting with the electrode reaction material, by comparing X-ray diffraction diagrams which are each obtained prior to, and subsequent to, the electrochemical reaction with electrode reaction material. For example, if the change of diffraction peak position is found by comparing before and after the electrochemical reaction with electrode reaction material, it is ascertained to correspond to the reaction phase capable of reacting with the electrode reaction material. In this case, for example, diffraction peaks corresponding to the reaction phase in the low crystallinity or amorphous phase can be observed in the range of 2θ=20° to 50°. Such reaction phase is considered to be formed by containing some of the above-mentioned constituent elements, for example, to result in its crystalline state such as low in crystallinity or amorphous, primarily due to the inclusion of the carbon element.

In the SnCoC content material, it is preferable that at least some portion of carbon is combined with the other constituent elements such as the metal or metalloid elements. This is preferred for the reason that the aggregation or crystallization of tin and so forth can be controlled. The chemical bonding state of elements can be ascertained by the X-ray photoelectron spectroscopy (XPS) method, for example. In existing XPS apparatus, Al—Kα line or Mg—Kα line is employed as soft X-ray line, for example. In the above-noted case where at least some portion of carbon is combined with the other constituent elements such as the metal or metalloid elements, the superimposed spectral peak of carbon is orbital (C is) appears in the region lower than 284.5 eV. In addition, the energy calibration for the measurements has been made according to the ordinary procedure such that the peak of gold atom 4f orbital (Au4f) is obtained to be 84.0 eV. During the measurements, since carbon is normally present as a surface contaminant on the surface of materials, the C1s peak of this surface contaminant carbon is assumed to be 284.8 eV and utilized as energy standard. Also in XPS measurements, since the spectral shape of C1s peak is usually obtained as the superposition of carbon peaks from the surface contaminant carbon and that included in the SnCoC content material, the shape is analyzed using commercially available software, for example, for these two peaks to be separated. In the spectral shape analysis, the position of the main peak on the side of the minimum binding energy is taken as the energy standard (284.8 eV).

In addition, the SnCoC containing material may contain additional constituent elements, where relevant. As the additional constituent elements, there adopted preferably are silicon, iron, nickel, chromium, indium, niobium, germanium, titanium, molybdenum, aluminum, phosphorus, gallium, and bismuth. These elements may be used singly or in combination of two or more.

Besides the SnCoC containing material, there also preferably used is the material containing tin, cobalt, iron, and carbon as constituent elements, i.e., SnCoFeC containing material. The composition of the SnCoFeC containing material can be set arbitrarily. For example, the composition of the material in the case of setting fewer iron content is as follows. Namely, the material composition in this case has a carbon content ranging from 9.9% to 29.7% by mass, an iron content ranging from 0.3% to 5.9% by mass, and the proportion of tin and cobalt contents (Co/(Sn+Co)) ranging from 30% to 70% by mass. As another example, the composition of the material in the case of setting more iron content is as follows. Namely, the material composition in this case has a carbon content ranging from 11.9% to 29.7% by mass. In addition, the proportion of tin, cobalt, and iron contents (Co+Fe)/(Sn+Co+Fe) is in the range from 26.4% to 48.5% by mass, and the proportion of cobalt and iron contents Co/(Co+Fe) is in the range from 9.9% to 79.5% by mass. This material is preferred for the reason of high energy densities obtained with these compositional ranges mentioned above. The physical properties and so forth for the SnCoFeC containing material are similar to those of the SnCoC containing material mentioned earlier.

In addition, as another anode substance, a carbon material is cited, for example. This material is noted for the reason that the material is suffered considerably less from the change in crystal structure during the insertion and extraction of the electrode reaction material, and high energy densities can be obtained with the material as well. In addition, this material also serves as an anode conductive agent. Examples of the carbon material include, for example, graphitizable carbon, non-graphitizable carbon with the (002) interplanar spacing of 0.37 nm or more, and graphite with the (002) interplanar spacing of 0.34 nm or less. More specifically, there cited are pyrolytic carbons, cokes, glassy carbon fibers, burned substances derived from high molecular compound, activated carbons, or carbon blacks. Among these materials, the cokes include pitch cokes, needle cokes, or petroleum cokes. There meant herein by "burned substances derived from high molecular compound" are the compounds derived from firing and carbonating phenol resin or furan resin at appropriate temperatures. In addition, the carbon materials may be used sufficiently in anyone of the shape among fiber, sphere, granule, or scale.

Moreover, as further anode substances, metal oxides or high molecular compounds may be cited, for example. The metal oxides may include iron oxides, ruthenium oxides, molybdenum oxides, and so forth. The high molecular compounds may include polyacetylene, polyaniline, polypyrrole, and so forth.

Undoubtedly, other materials than those mentioned above may also be used as the anode substance. In addition, the above series of active anode material may also be used after mixing two or more materials in arbitrary combination.

The active anode material layer 2 is formed by the coating method, gas phase method, liquid phase method, spraying method, or firing method (sintering method), for example; or by suitably combining two or more of the abovementioned methods. The coating method indicates herein the method, in which after mixing granular active anode material with anode biding agent and so forth, dispersing the mixture into a solvent, the resulting composition is applied by coating, for example. Examples of the gas phase method include the physical depositing method and chemical deposition method. Specifically, there cited are the vacuum evaporation method, sputtering method, ion plating method, laser ablation method, chemical vapor deposition (CVD) method, plasma chemical vapor growth method, and so forth. Examples of the liquid phase method include the electrolytic plating method, electroless plating method, and so forth. The spraying method is the method, in which the active anode material is sprayed in molten state or semi-molten state of the material. The firing method indicates herein the method, in which the composition resulted from coating according to the process similar to the abovementioned coating method, is heat processed at temperatures higher than the melting point of the anode binding agent and the like. As the firing method, well-known techniques can be used. Examples of the firing method include the ambient firing method, reaction firing method, hot-press firing method, and so forth. Particularly, it is preferred for the active anode material layer 2 to be formed by the gas phase method. This is for the reason that the active anode material layer 2 is sufficiently combined with the anode current collector 1, and that the adhesion of active anode material layer 2 is increased as a result.

[Detailed Example of Anode Construction]

A detailed example of the construction of anode 10 will be explained hereinbelow.

Figure 3A:
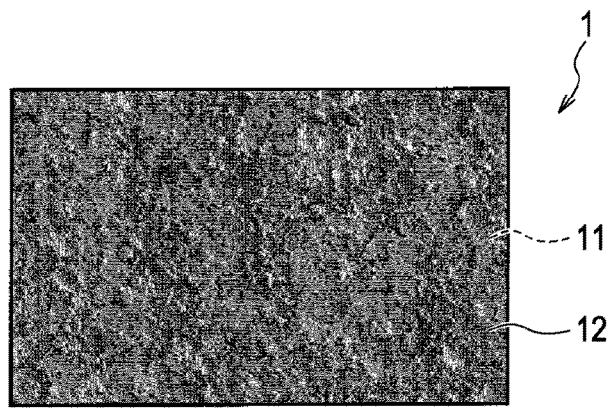
FIG. 3A shows a SEM photograph illustrating the surface structure of the anode current collector according to an embodiment of the invention.
Figure 6A:
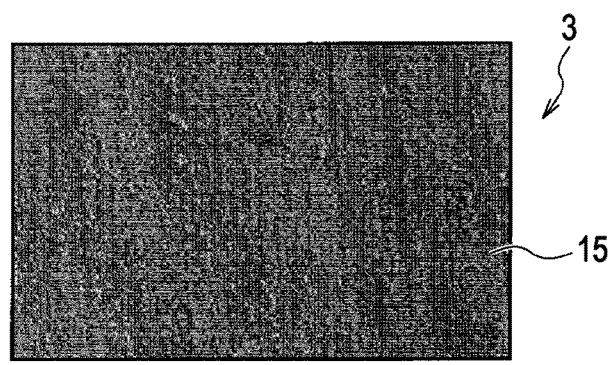
FIG. 6A shows a SEM photograph illustrating the surface structure of the anode current collector of a comparative example.
Figure 6B:
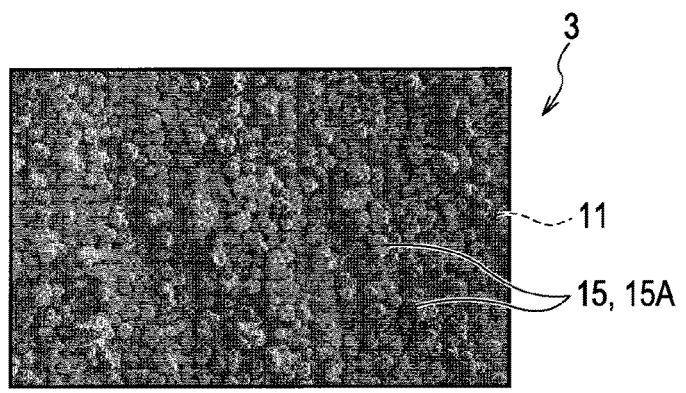
FIG. 6B shows a SEM photograph at high magnification illustrating the surface structure of the anode current collector of FIG. 6A.
Figure 7A:
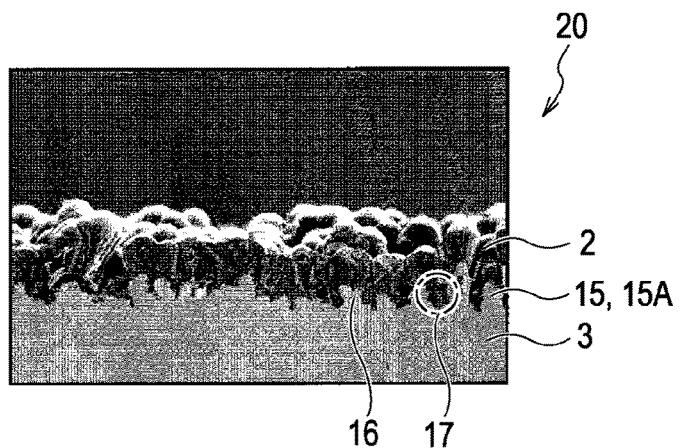
FIG. 7A shows a SEM photograph illustrating the cross-sectional structure of the anode current collector of the comparative example.
Figure 7B:
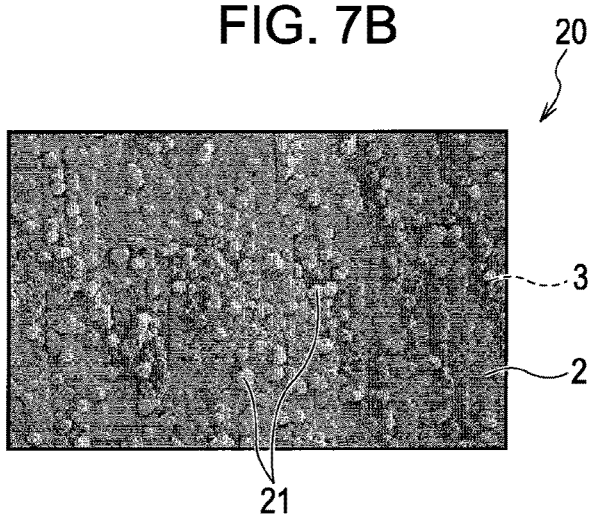
FIG. 7B shows a SEM photograph illustrating the surface structure of the anode current collector corresponding to FIG. 7A.

FIGS. 3A through FIG. 7B include SEM photographs (secondary electron images) of the anodes. FIGS. 3A through FIG. 5B illustrate surface structures and cross-sectional structures of the anode current collector 1 and anode 10 according to embodiments of the present invention, while FIGS. 6A through 7B illustrate the surface structures and cross-sectional structures of another anode current collector 3 and anode 20 according to comparative examples of the invention. In addition, FIGS. 3A, 3B, 6A, and 6B illustrate surface structures, in which FIGS. 3A and 6A are low magnification images thereof and FIGS. 3B and 6B are higher magnification images. FIGS. 4A and 4B illustrate ultra-high magnification images of surface structures, in which FIG. 4B is an enlarged image of the region R of FIG. 4A. In regard to FIGS. 5A, 5B, 7A, and 7B, FIGS. 5A and 7A illustrate cross-sectional structures, while FIGS. 5B and 7B illustrate surface structures. In addition, the anode current collector 3 in the comparative example is formed with an electrolytic foil.

Figure 3B:
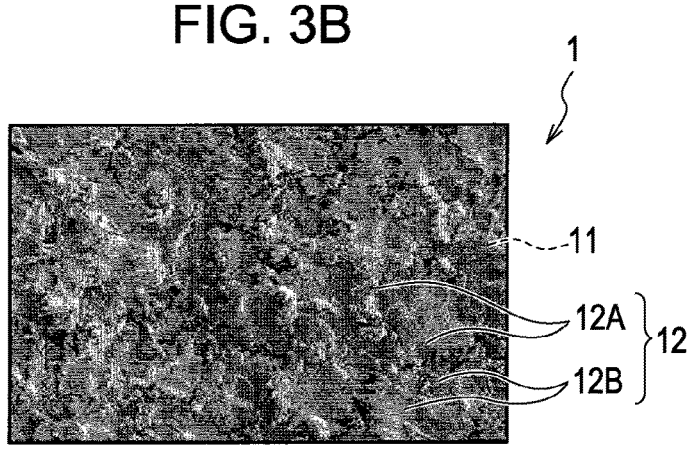
FIG. 3B shows a SEM photograph at high magnification illustrating the surface structure of the anode current collector according to an embodiment of the invention.

Referring to FIGS. 3A and 3B, when the surface of anode current collector 1 of the invention is observed, a first plurality of conductive particles 12, which are formed on the surface of current collector body 11 by the spraying method, are found to contain a second plurality of spherical particles 12A and a third plurality of plate-like particles 12B. Since the second plurality of spherical particle 12A and the third plurality of plate-like particle 12B are considerably different with each other in structural features such as outer appearance (profile) and size (mean particle size), these two can be distinguished clearly by SEM photographs. When the spraying method is used, a molten material is sprayed onto the surface of current collector body 11, the molten material becomes crushed flat and subsequently cooled (fixed by solidifying), thereby forming plate-like particles 12B. As a result, the facial shape becomes irregular (indefinite). In this case, although the plurality of spherical particle 12A and plate-like particle 12B are piled up with each other, the plate-like particles 12B are partially overlapped with each other and the spherical particles 12A overlie the plate-like particles 12B on the outermost surface of anode current collector 1.

Figure 4A:
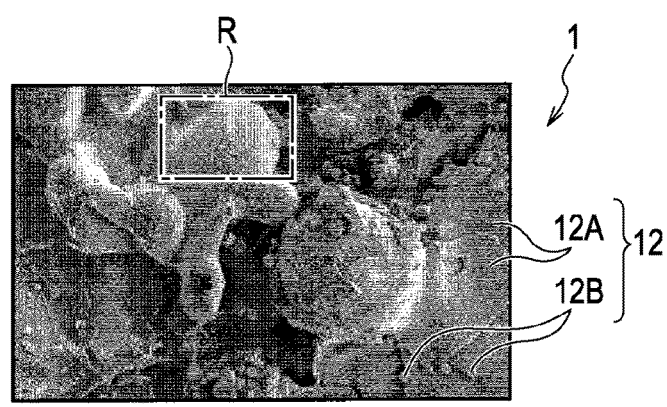
FIG. 4A shows a SEM photograph at ultra high magnification illustrating the surface structure of the anode current collector according to an embodiment of the invention.
Figure 4B:
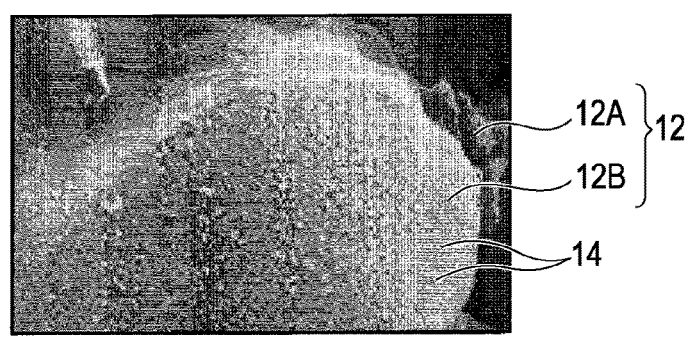
FIG. 4B shows a SEM photograph illustrating an enlarged image of the portion of FIG. 4A.

In addition, when the surface of anode current collector 1 is observed at such a degree of magnification as to be able to clearly identify the profile of spherical particles 12A, as shown in FIGS. 4A and 4B, several oxides 14 are formed on the surface of spherical particle 12A and plate-like particle 12B. When the spherical particles 12A and plate-like particles 12B are metal particles, the above-mentioned oxides 14 are metal oxides. The oxides 14 have grown having fibrous shapes on the surface of the spherical particles 12A and plate-like particles 12B.

Moreover, referring to FIG. 4A, when the section of the anode 10 of the invention is observed, the plate-like particles 12B are formed by being extended in the direction along the surface of the current collector body 11, and these particles 12B are partially overlapped with each other on the outermost surface of anode current collector 1. In this case, the plate-like particle 12B is bent such that the end portion 12BT thereof moves away from the surface of the current collector body 11. As a result, underside of the end portion 12BT, some gaps 13 are formed each having the shape of hollow extending in the same direction as that of extension of the plate-like particle 12B. Since the gap 13 is located to be hidden behind when viewed from the side of forming the active anode material layer 2, the active anode material layer 2 does not intrude into the gap 13. As a result, the gap 13 is capable of operating as the space for releasing stress during electrode reactions. On the other hand, the spherical particles 12A are located at random either on the plate-like particle 12B, inside the gap 13, or the like. In addition, as shown in FIG. 4B, being formed on the anode current collector 1 by the gas phase method such as the evaporation method, the active anode material layer 2 includes active anode materials with the shape of plural particulates (active anode material particles 21).

On the other hand, as shown in FIGS. 6A and 6B, when the surface of anode current collector 3 (electrolytic foil) of the comparative example is observed, a plurality of conductive particles 15 are found, which are formed by the electrolytic method. This plurality of conductive particles 15 includes only spherical particles 15A, but not the plate-like particle. Moreover, as clearly indicated from the comparison of FIGS. 3A and 3B, and FIGS. 6A and 6B, the particle size of spherical particles 15A formed by the electrolytic method is clearly larger than that of spherical particle 12A formed by the spraying method.

In addition, when the section of anode 20 of the comparative example is observed, as shown in FIG. 7A, the plurality of spherical particles 15A operate to form several protruded portions 16, which extend in the thickness direction of the active anode material layer 2, by locally gathering together and piling up with each other. Therefore, several gaps 17 are formed to have the shape of hollow between neighboring protruded portions 16 extending in the same direction. Since these gaps 17 are not located this time to be hidden behind when viewed from the side of forming the active anode material layer 2, the active anode material layer 2 comes to intrude into the gap 17. As a result, the gap 17 is not capable of operating as the space for releasing stress during electrode reactions. In addition, as shown in FIG. 7B, the active anode material layer 2 is formed by including the plurality of active anode material particles 21 in a manner similar to the case shown in FIG. 5B of the invention.

As clearly indicated by the SEM images shown in FIGS. 3A through FIG. 7B, it can be ascertained visually whether the plurality of conductive particles 12 contain the spherical particle 12A and the plate-like particle 12B, by observing the surface structure and cross-sectional structure of the anode using SEM and so forth. Furthermore, by examining the conditions such as the particle size of spherical particles 12A and whether the plate-like particles 12B are included, it can be determined that the anode current collector has been formed with mere electrolytic copper foil as-is or with electrolytic copper foil processed by the spraying method and so forth.

[Manufacturing Method of Anode]

The anode is manufactured by the following procedures, for example.

First, an anode current collector 11 is prepared by including electrolytic copper foil and so forth. Thereafter, a first plurality of conductive particles 12 are formed on the surface of the anode current collector 11 using the spraying method and so forth. When the spraying method is used for forming the first plurality of conductive particles 12, plate-like particles 12B are formed together with spherical particles 12A, since a molten material is sprayed onto, and accumulated on, the surface of current collector body 11. As a result, the anode current collector 1 is formed by including the current collector body 11 which is provided on the surface thereof with the first plurality of conductive particles 12 (spherical particles 12A and plate-like particles 12B). Lastly, an active anode material layer 2 is formed on the surface of the anode current collector 1 using the gas phase method and so forth. The anode is thus completed.

[Operation and Effect of the Embodiment]

With the anode including the current collector according to the embodiment, the anode current collector 1 is formed by including the first plurality of conductive particles 12 on the surface of the current collector body 11, and the plurality of conductive particles 12 include a second plurality of spherical particles 12A and a third plurality of plate-like particles 12B. As a result, the tridimensional structure having complex shape (irregularities) is formed on the surface of the current collector body 11 with the spherical particles 12A and plate-like particles 12B. In this case, since the anchoring effects are considerably increased comparing with the case where the plural conductive particles 12 contain only spherical particles 12A, the adhesion of active anode material layer 2 to anode current collector 1 is greatly increased. Therefore, the present anode employing the current collector can contribute to the improvement in the performance of electrochemical devices. More specifically, when the anode and current collector are adapted to rechargeable batteries, the cycle characteristics can be improved.

Particularly, in the section of anode current collector 1, when plate-like particles 12B are each formed by being bent such that the end portion 12BT thereof moves away from the surface of the current collector body 11, the space (gap 13) is secured for releasing stress during electrode reactions. Therefore, since the anode current collector 1 becomes hardly deformed and the active anode material layer 2 becomes hardly damaged as well during electrode reactions, the performance of electrochemical devices can be improved.

In addition, when plural conductive particles 12 are formed by the spraying method, since molten materials for constituting the particles tend to be each formed by having the shape different with each other, the second plurality of spherical particles 12A and the third plurality of plate-like particle 12B can be formed collectively with relative ease.

<2 Electrochemical Device (Rechargeable Battery) Using Current Collector and Anode>

In the next place, several examples on the use of the above-mentioned current collector and anode will be described hereinbelow. In the present case where a rechargeable battery is cited as an example of electrochemical devices, the current collector and anode are utilized in the rechargeable battery in the following manner.

<2-1 First Rechargeable Battery (Cylinder Type)>

Figure 8:
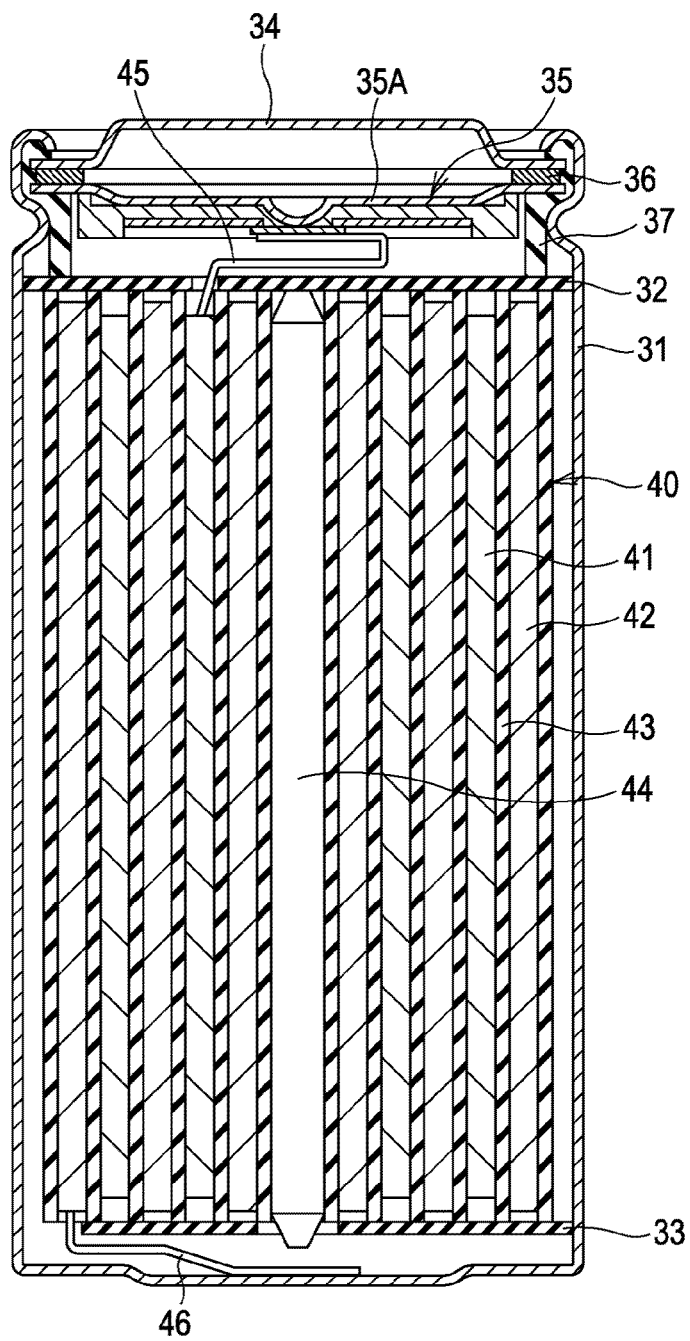
FIG. 8 is a drawing schematically illustrating the sectional construction of a first rechargeable battery using the current collector and the anode according to an embodiment of the invention.
Figure 9:
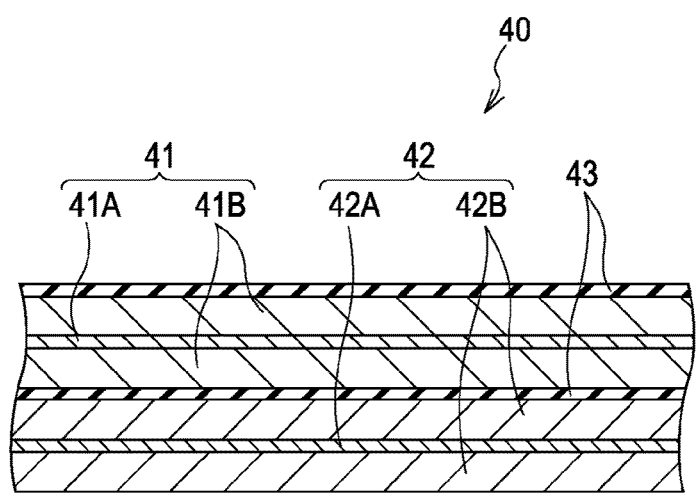
FIG. 9 is a section view schematically illustrating the structure of the spirally wound electrode body of FIG. 8.

FIGS. 8 and 9 illustrate the sectional construction of the first rechargeable battery, and FIG. 9 shows an enlarged view of the spirally wound electrode body 40 of FIG. 8. The rechargeable battery explained herein is a rechargeable lithium-ion battery which is devised such that the capacity of the anode is represented by the intercalation (or insertion) and excalation (or extraction) of lithium ions as the electrode reaction substance.

[Overall Structure of Rechargeable Battery]

The rechargeable battery is formed by primarily including a pair of insulating plates, 32 and 33, and the spirally wound electrode body 40 contained in a substantially hollow cylindrical-shaped battery can 31. The battery structure employing such battery can 31 is called as cylindrical type.

The battery can 31 is formed, for example, having the hollow cylindrical structure such that one of the ends thereof is closed while the other end is open, and made of iron, aluminum, alloys thereof, and so forth. In addition, when the battery can 31 is formed with iron, the surface of battery can 31 may be plated with nickel, for example. The pair of insulating plates 32 and 33 are disposed to interleave the spirally wound electrode body 40 between the insulating plates, one from the top the other from the bottom, so as to extend in the direction perpendicular to the face of the spiral winding.

At the open end of the battery can 31, there mounted by being caulked with the gasket 37 are a battery top cap 34, a safety valve mechanism 35, and a heat sensing resistance element 36 (PTC element with positive temperature coefficient), whereby the interior of the battery can 31 is sealed. The battery top cap 34 is made of, for example, the material same as the battery can 31. The safety valve mechanism 35 and heat sensing resistance element 36 are disposed inside the battery top cap 34. The safety valve mechanism 35 is electrically connected with the battery top cap 34 through the heat sensing resistance element 36. The safety valve system 35 is configured, when an internal pressure in the battery increases either to a certain value or higher due to an internal short circuit or externally applied heat, such that a disc plate 35A is made to flip so as to disconnect the electrical connection between the battery top cap 34 and the spirally wound electrode body 40. The heat sensing resistance element 36 is operative to increase the resistance (limit the current) with the increase in temperature, thereby preventing abnormal heat generation by a large current. The gasket 37 is made of an insulating material and its surface is coated with asphalt, for example.

The spirally wound electrode body 40 is formed by laminating and spirally winding the cathode 41 and anode 42 together with a separator 43 intervening therebetween. A center pin 44 may be inserted at the center of the spirally wound electrode body 40. In the spirally wound electrode body 40, a cathode lead 45 made of aluminum and so forth is connected to the cathode 41, while an anode lead 46 made of nickel and so forth is connected to the anode 42. The cathode lead 45 is welded onto the safety valve mechanism 35 so as to be electrically connected to the battery top cap 34, while the anode lead 46 is welded onto the battery can 31 so as to be electrically connected thereto.

[Cathode]

The cathode 41 is formed, for example, including a cathode current collector 41A which is provided on the both sides thereof with active cathode material layers 41B. In this regard, the active cathode material layer 41B may be provided alternatively on one side of the cathode current collector 41A.

The cathode current collector 41A is formed, for example, with aluminum, nickel, or stainless steel.

The active cathode material layer 41B includes, as the active cathode material, one kind of, or two or more kinds of, cathode materials which are capable of inserting or extracting lithium ions, and may also include other materials such as a cathode binding agent, cathode conductive agent, and so forth, when necessary.

As the cathode material, lithium containing compounds are preferred. This is for the reason of high energy density obtained with these compounds. There cited as the lithium containing compounds are compound oxides containing lithium and transition metal elements as constituent elements, phosphate compounds containing lithium and transition metal elements as constituent elements, for example. Among others, preferably cited are the compounds containing at least one element selected from the group including cobalt, nickel, manganese, and iron, as the transition metal elements. This is for the reason of higher voltages obtained with the compounds. The chemical formulae of these compounds are expressed by $Li_xM1O_2$ and $Li_yM2PO_4$, where each of M1 and M2 represents one or more kinds of the transition metal element. In addition, the values of x and y in the formulae vary in response to the state of charge and discharge, and the ranges thereof are usually $0.05 \leq x \leq 1.10$ and $0.05 \leq y \leq 1.10$, respectively.

As the compound oxides containing lithium and transition metal elements, there cited are lithium cobalt compound oxide ($Li_xCoO_2$), lithium nickel compound oxide ($Li_xNiO_2$), and lithium nickel series compound oxide expressed by the following chemical formula, for example. In addition, as the phosphate compounds containing lithium and transition metal elements, there cited are lithium iron phosphate compound ($LiFePO_4$) and lithium iron manganese phosphate compound ($LiFe_{1-u}Mn_uPO_4$ (u<1)), for example. This is for the reason of high battery capacity and excellent cycle characteristics as well obtained with these compounds.

The chemical formula of the abovementioned lithium nickel series compound oxide is $LiNi_{1-x}M_xO_2$, where M is at least one element selected from the group including cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony, and niobium, and where x is given by $0.005 < x < 0.5$.

In addition, as other cathode substances, an oxide, disulfide, chalcogen compound, and conductive polymer are cited, for example. Examples of the oxide include titanium oxide, vanadium oxide, manganese dioxide, and so forth. Examples of the disulfide include titanium disulfide, molybdenum sulfide, and so forth. Examples of the chalcogen compound include niobium selenide and so forth. Examples of the conductive polymer include sulfur, polyaniline, polythiophene, and so forth.

Undoubtedly, further materials other than those mentioned above may also be employed as the cathode material. In addition, the abovementioned series of cathode materials may also be employed after appropriately mixing two or more materials in arbitrary combination.

As the cathode biding agent, there cited are synthetic rubbers such as styrene-butadiene rubber, fluoro-rubber, ethylene-propylene-diene terpolymer, and so forth, and polymer materials such as the polyvinylidene-fluoride and so forth. These materials may be used singly, or in combination after appropriately mixing two or more materials.

As the cathode conductive agent, there cited are carbon materials, such as graphite, carbon black, acetylene black, ketjen black, and so forth, for example. These materials may be used singly, or in combination after mixing two or more materials. In addition, other metal materials and conductive polymer may also be used as the cathode conductive agent, as long as they are appropriately conductive.

[Anode]

The anode 42 is formed, for example, including an anode current collector 42A which is provided on the both sides thereof with active anode material layers 42B. In this regard, the active anode material layer 42B may be provided alternatively on one side of the anode current collector 42A. In addition, the structure of the anode current collector 42A and active anode material layer 42B is similar to that of the anode current collector 1 and active anode material layer 2 of the anode mentioned earlier.

[Separator]

A separator 43 is operative to separate the cathode 41 and anode 42, and allow passage of lithium ions while preventing short-circuit of current resulted from the contact of the two electrodes. The separator 43 is formed by impregnating with liquid electrolyte (electrolyte solution). The separator 43 is formed, for example, including a porous membrane containing synthetic resins such as polytetrafluoroethylene, polypropylene, polyethylene, and so forth, and a further porous membrane includes ceramics, and the separator may include alternatively a laminated structure with two or more kinds of these porous membranes.

[Electrolyte Solution]

The electrolyte solution is formed by dissolving electrolytic salts into a solvent, and the solution may further include other materials such as various additives, when necessary.

The solvent is prepared, for example, including one kind of, or two or more kinds of, nonaqueous solvents such as organic solvents. A series of solvents (nonaqueous solvents) cited hereinbelow may be employed singly, or in combination of two or more kinds of the solvents after appropriately mixing.

As the nonaqueous solvents, some examples follow. Namely, the examples include ethylene carbonate, propylene carbonate, butylene carbonate, dimethyl carbonate, diethyl carbonate, ethyl methyl carbonate, methyl propyl carbonate, γ-butyloactone, γ-valerolactone, 1,2-dimethoxyethane, and tetrahydrofuran. The examples additionally include 2-methyl tetrahydrofuran, tetrahydropyran, 1,3-dioxolan, 4-methyl-1,3-dioxolan, 1,3-dioxane, and 1,4-dioxane. The examples further include methy acetate, ethyl acetate, methy propionate, ethyl propionate, methy butyrate, methy isobutyrate, methyl trimethylacetate, and ethyl trimethylacetate. The examples further include acetonitrile, glutaronitrile, adiponitrile, methoxyacetonitrile, 3-methoxypropionitrile, N,N-dimethylformamide, N-methypyrrolidinone, and N-methyl oxazolidinone. The examples further include N,N'-dimethyl imidazolidinone, nitromethane, nitroethane, sulfolane, trimethyl phosphate, and dimethy sulfoxide. This is for the reason of excellent battery capacity, cycle characteristics, storage characteristics, and so forth, which are obtained with these solvents.

Among others, there preferred is at least one selected from the group including ethylene carbonate, propylene carbonate, dimethyl carbonate, diethyl carbonate, and ethyl methyl carbonate. This is for the reason of excellent battery capacity, cycle characteristics, storage characteristics, and so forth, which are obtained with these solvents. In this case, more preferred is the combination of highly viscous (high dielectric) solvents (relative dielectric constant $\epsilon \geq 30$, for example) such as ethylene carbonate, propylene carbonate, and so forth, with less viscous solvents (viscosity $\leq 1$ mPa·s, for example) such as dimethyl carbonate, ethyl methyl carbonate, diethyl carbonate and so forth. This is for the reason of the improvement of the dissociation property of electrolytic salts and the mobility of the ions.

In particular, it is preferred for the solvent to include at least one of halogenated linear carbonates and halogenated cyclic carbonates. This is for the reason that a stable protective film is formed on the surface of anode 42 during charge and discharge and the decomposition reaction of the electrolyte solution is suppressed as a result. Incidentally, the halogenated linear carbonate is a linear carbonate containing halogen as its constituent element, which is formed, more specifically, by substituting at least a part of hydrogen elements constituting the linear carbonate with halogen. In addition, the halogenated cyclic carbonate is a cyclic carbonate containing halogen as its constituent element, which is formed by substituting at least a part of hydrogen elements constituting the cyclic carbonate with halogen.

Although the kind of halogen is not specifically limited, fluorine, chlorine, and bromine are preferred, and fluorine is more preferred. This is for the reason of greater effects of the substitution obtained with fluorine than other halogens. In addition, as the number of the halogen, two as well as three or more are preferred to one. This is for the reason that the decomposition reaction of electrolyte solution is suppressed further, since the capability of forming the protective film increases and more robust and stable protective films are formed.

There cited as the halogenated linear carbonates are, for example, carbonic acid fluoromethylmethyl ester, carbonic acid bis(fluoromethyl) ester, carbonic acid methyl(difluoromethyl) ester, and so forth. There cited as the halogenated cyclic carbonates are, for example, 4-fluoro-1,3-dioxolane-2-on and 4,5-difluoro-1,3-dioxolane-2-on, and so forth. The halogenated cyclic carbonates also include geometric isomers thereof. The content of the halogenated linear carbonates and halogenated cyclic carbonates in solvent is in the range from 0.01% to 50% by weight, for example.

In addition, it is preferable for the solvent to include cyclic unsaturated hydrocarbon acid esters. This is for the reason that the decomposition reaction of electrolyte solution is suppressed since a stable protective film is formed on the surface of the anode 42 during charge and discharge period. In this regard, the cyclic unsaturated hydrocarbon acid ester is cyclic carbonic acid ester containing unsaturated carbon bonds, in which an unsaturated carbon bond is introduced into a certain location of the cyclic carbonic acid ester, to be more specific. As the cyclic unsaturated hydrocarbon acid ester, vinylene carbonate, vinylethylene carbonate, and so forth are cited, for example. The content of the cyclic unsaturated hydrocarbon acid ester in solvent is in the range from 0.01% to 10% by weight, for example.

In addition, it is preferable for the solvent to include sultone (cyclic sulfonate). This is for the reason of the improvement of chemical stability of the electrolyte solution. As the sultone, propanesulton, propenesulton, and so forth are cited, for example. The content of sultone in solvent is in the range from 0.5% to 5% by weight.

Moreover, it is preferred for the solvent to include acid anhydride. This is for the reason of the improvement of chemical stability of the electrolyte solution. As the acid anhydride, there cited are carboxylic anhydride, disulfonic anhydride, carboxylic acid sulfonic acid anhydride, and so forth, for example. The carboxylic anhydride includes, for example, succinic anhydride, glutaric anhydride, maleic anhydride, and so forth. The disulfonic anhydride includes, for example, ethane disulfonic acid anhydride, propane disulfonic acid anhydride, and so forth. The carboxylic acid sulfonic acid anhydride includes, for example, sulfobenzoic acid anhydride, sulfopropionic acid anhydride, sulfobutyric acid anhydride, and so forth. The content of the acid anhydride in solvent is in the range from 0.5% to 5% by weight, for example.

The electrolyte salt includes either one kind of, or two or more kinds of light metal salts such as lithium salt, for example. A series of electrolyte salts mentioned as follows may be employed singly, or in combination of two or more kinds thereof.

As lithium salts, for example, there cited are lithium hexafluorophosphate ($LiPF_6$), lithium tetrafluoroborate ($LiBF_4$), lithium perchlorate ($LiClO_4$), and lithium hexafluoroarsenate ($LiAsF_6$). Further cited are lithium tetraphenylborate ($LiB(C_6H_5)_4$), lithium methanesulfonate ($LiCH_3SO_3$), lithium trifluoromethanesulfonate ($LiCF_3SO_3$), and lithium tetrachloroaluminate ($LiAlCl_4$). Further still cited are lithium hexafluorosilicate ($Li_2SiF_6$), lithium chloride (LiCl), and lithium bromide (LiBr). This is for the reason of excellent battery capacity, cycle characteristics, storage characteristics, and so forth, which are obtained with these salts.

Among others, there preferred is at least one kind of the salt selected from the group including lithium hexafluorophosphate, lithium tetrafluoroborate, lithium perchlorate, and lithium hexafluoroarsenate. In addition, lithium hexafluorophosphate and lithium tetrafluoroborate are more preferred, and lithium hexafluorophosphate is preferred further more. This is for the reason of greater effects of the abovementioned characteristics as a result of the decrease in internal resistance obtained with these salts.

The content of the electrolyte salt is preferably in the range from 0.3 to 3.0 mol/kg based on the weight of the solution. This is because of the high ionic conductivity obtained with the salts.

[Operation of Rechargeable Battery]

During charging in the rechargeable battery, lithium ions are extracted from the cathode 41 and inserted into the anode 42 through electrolyte solution impregnated in the separator 43. By contrast, when the rechargeable battery is discharged, lithium ions are extracted from the anode 42, and are inserted into the cathode 41 through the electrolyte solution impregnated in the separator 43, for example.

[Manufacturing Method of Rechargeable Battery]

The rechargeable battery is manufactured through the following steps, for example.

In the first place, the cathode 41 is formed. Firstly, a cathode mixture is prepared by mixing an active cathode material with a cathode binding agent, cathode conductive agent, and so forth, when necessary, which are thereafter dispersed in an organic solvent, whereby the cathode mixture slurry in pasteform is prepared. Subsequently, the cathode mixture slurry is applied uniformly on both sides of cathode current collector 41A and dried afterward, whereby the active cathode material layer 41B is formed. Lastly, the active cathode material layer 41B is compression molded using a roller press machine and so forth, while heating when necessary. In this case, the step of compression molding may be repeated for several times.

In the next place, by carrying out the steps similar to those for forming the abovementioned cathode, the anode 42 is formed. In this case, after preparing the anode current collector 42A, the active anode material layer 42B is formed on both sides of the anode current collector 42A.

Finally, a rechargeable battery is assembled from the cathode 41 and anode 42. First, a cathode lead 45 is attached to the cathode current collector 41A by welding and so forth, while an anode lead 46 is attached to the anode current collector 42A by welding and so forth. Subsequently, the spirally wound electrode body 40 is formed by laminating and spirally winding the cathode 41 and anode 42 together with a separator 43 intervening therebetween, and a center pin 44 is then inserted into the center of the spiral winding. Thereafter, while the spirally wound electrode body 40 is sandwiched between the pair of insulating plates 12 and 13, they are contained into inside the battery can 31. In this case, the cathode lead 45 is attached to a safety valve mechanism 35 by welding and so forth, while the anode lead 46 is attached to the battery can 31 by welding and so forth. Subsequently, the electrolytic solution is injected into the battery can 31 so as to impregnate the separator 43 with the electrolytic solution. Finally, the battery top cap 34, safety valve mechanism 35, and heat sensing resistive element 36 are caulked with the gasket 37 at the open end portion of the battery can 31. Thereby, the rechargeable battery illustrated in FIGS. 8 and 9 is completed.

With the first rechargeable battery thus formed, since the anode 42 is formed by having the composition similar to the aforementioned anodes, the cycle durability can be improved. Particularly, since the improvement of the cycle durability is evident in the case where silicon containing or tin containing material is used, which is effective for increasing battery capacity, greater effects can be obtained comparing with the case where the carbon material and so forth are used. Other effects with the first rechargeable battery are the same as those with the anodes mentioned earlier.

<2-2 Second Rechargeable Battery (Laminate Film Type)>

Figure 10:
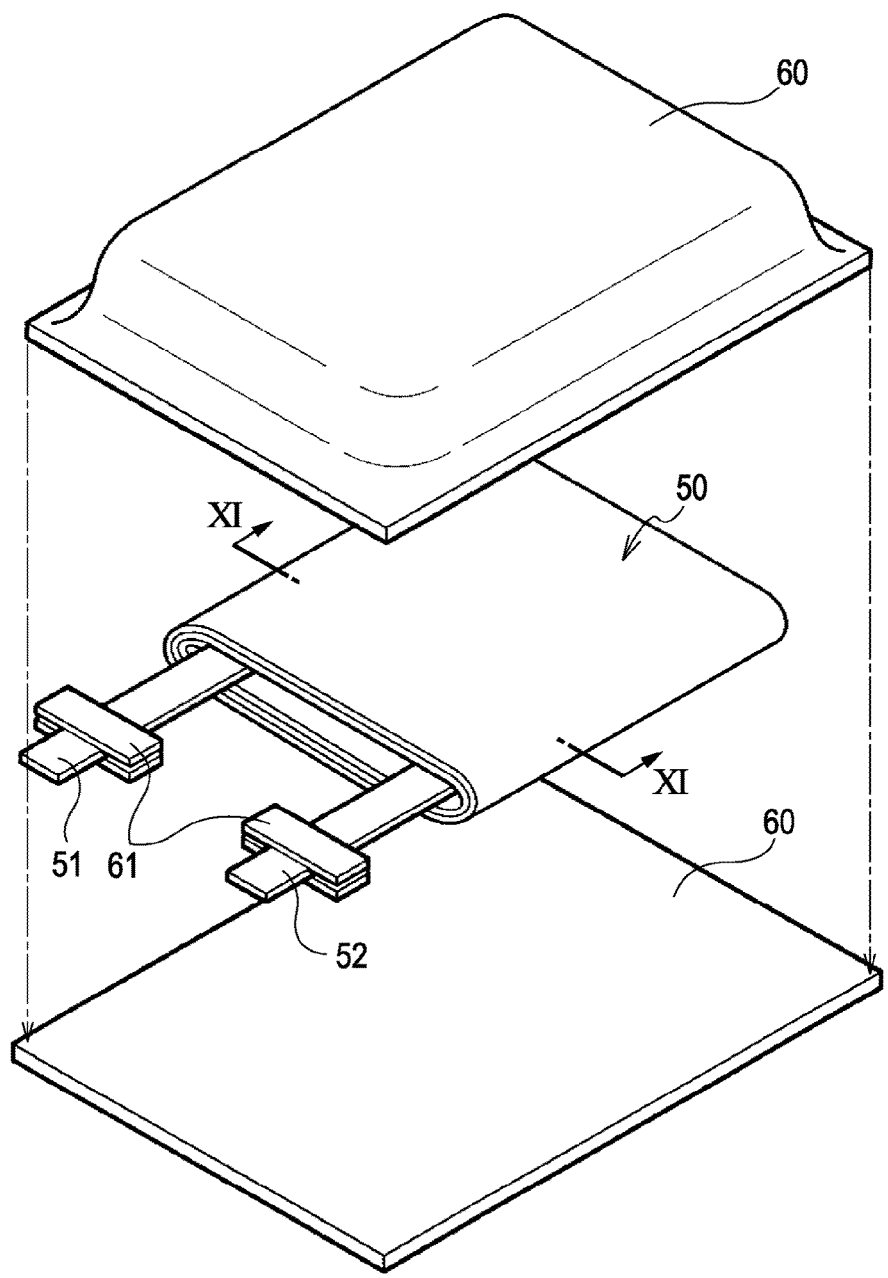
FIG. 10 is an exploded perspective view illustrating a second rechargeable battery using a current collector and an anode according to an embodiment of the invention.
Figure 11:
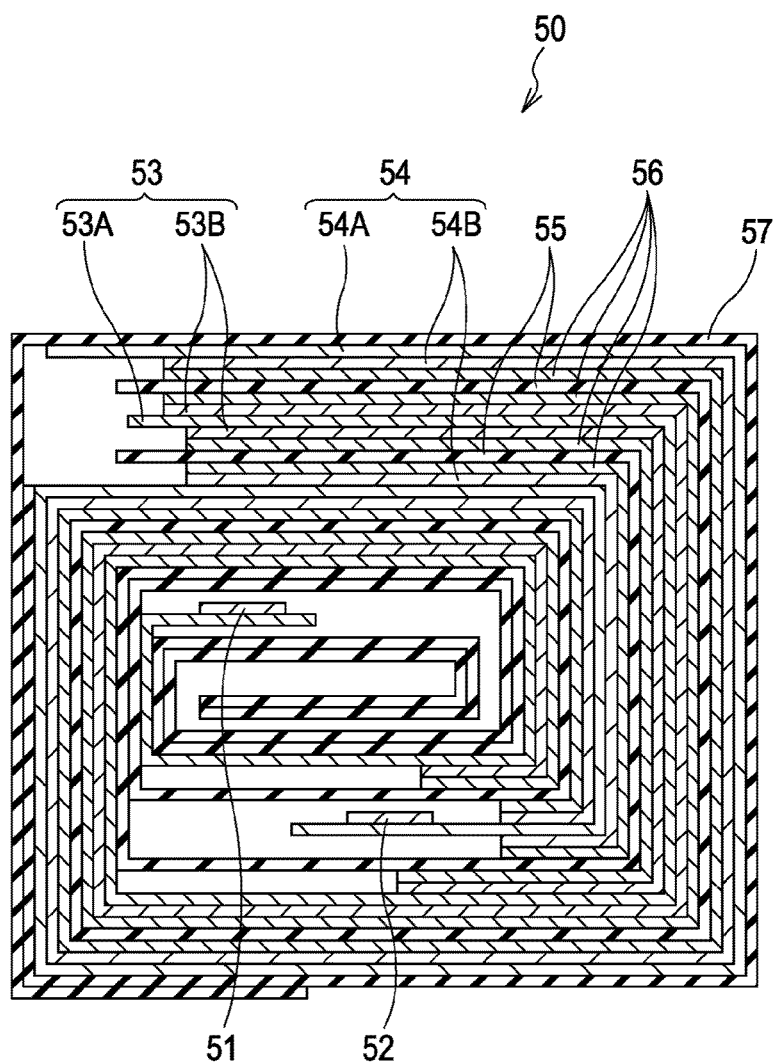
FIG. 11 is a section view taken along the line XI-XI of the spirally wound electrode body of FIG. 10.

FIG. 10 shows an exploded perspective view of the second rechargeable battery and FIG. 11 shows a sectional view taken along the line XI-XI of a spirally wound electrode body 50 of FIG. 10.

This rechargeable battery is a rechargeable lithium-ion battery similarly to the aforementioned first rechargeable battery, and formed primarily containing, inside a film outer housing member 60, the spirally wound electrode body 50 to which the cathode lead 51 and anode lead 52 are attached. The structure of the battery employing such outer housing member 60 is called the laminate film type.

The cathode lead 51 and anode lead 52 are drawn out from the interior of the outer housing member 60 in the same direction toward the exterior, for example. However, the location of the spirally wound electrode body 50, where the cathode lead 51 and anode lead 52 are attached to, or the direction of drawing these leads out is not specifically limited. The cathode lead 51 is made of, for example, aluminum and so forth, while the anode lead 52 is made of, for example, copper, nickel, stainless steel, or the like. These materials are employed in the shape of, for example, thin plate (or laminate), or mesh.

The outer housing member 60 is formed as a laminate film including a fused layer, metal layer, and surface protective layer which are accumulated in the order stated. In this case, two fused layers of the laminate film are disposed each to face the spirally wound electrode body 50 such that the outer edge portions of the two fused layers are adhered with each other by fusion bonding or pasting with an adhesive. The fused layers are films made of polyethylene, polypropylene, or the like. The metal layer is aluminum foil or the like, for example. The surface protective layer is a film made of nylon, polyethylene terephthalate, or the like, for example.

Among others, an aluminum laminated film is preferably used as the outer housing member 60, which is formed by laminating a polyethylene film, aluminum foil, and nylon film in this order. In addition, in place of the aluminum laminated film mentioned just above, another laminated film with different structure, a film of polymer molecule such as polypropylene and so forth, or of metal, may alternatively be used as the outer housing member 60.

An adherence film 61 is inserted between the outer housing member 60 and both cathode lead 51 and anode lead 52, for preventing the intrusion of the outside air. This adherence film 61 is made of a material having the adhesion capability to the cathode lead 51 and anode lead 52. There cited as such materials are polyolefin resins such as polyethylene, polypropylene, modified polyethylene, modified polypropylene, and so forth, for example.

The spirally wound electrode body 50 is formed as a spirally wound laminate including the cathode 53 and anode 54 together with both separator 55 and electrolyte layer 56 disposed in between, and the outermost portion of the spirally wound electrode body is protected with a protective tape 57. The cathode 53 has a structure in which an active cathode material layer 53B is disposed on both sides of the cathode current collector 53A. As for the anode 54, an active anode material layer 54B is disposed on both sides of the anode current collector 54A for example.

In addition, the structures of the cathode current collector 53A and active cathode material layer 53B are the same as those of the cathode current collector 41A and active cathode material layer 41B of the first rechargeable battery, respectively. The structures of the anode current collector 54A and active anode material layer 54B are the same as those of the anode current collector 42A and active anode material layer 42B of the first rechargeable battery, respectively. The structure of the separator 55 is the same as that of the separator 43 included in the first rechargeable battery.

The electrolyte layer 56 is formed with a polymer compound as holding body for holding the electrolyte solution, and the layer may also include other materials such as various additive agents, when necessary. This electrolyte layer 56 is formed as the so-called gel electrolyte. The gel electrolyte is preferable, because it can yield high ionic conductivity (1 mS/cm or greater at room temperature, for example), and can prevent the leakage of the electrolyte solution as well.

As the polymer compound, there cited is at least one kind of the following compounds, for example. Examples of the polymer compound include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. The examples further include polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. The examples additionally include a copolymer of polyvinylidene fluoride and polyhexafluoropyrene. The compounds may be used singly, or in combination of two or more kinds after appropriately mixed. Among others, polyvinylidene fluoride or the copolymer of vinylidene fluoride and hexafluoropyrene is desirable. This is for the reason of electrochemical stability obtained with the copolymer.

The composition of the electrolyte solution is the same as that of the aforementioned first rechargeable battery. In this regard, it is noted with the electrolyte layer 56 as gel electrolyte that the solvent of electrolyte solution has a wider concept including not only a liquid solvent but also such a solvent as having the ionic conductivity capable of causing dissociation of the electrolyte salt. Therefore, in the case where a polymer compound having ionic conductivity is used, this polymer compound is also included within the concept of the present solvent.

In addition, in place of the gel electrolyte layer 56 in which the electrolyte solution is held by the polymer compound, an electrolyte solution may be used as it is. In this case, the electrolyte solution is impregnated in the separator 55.

During charging in the rechargeable battery, lithium ions are extracted from the cathode 53 and inserted into the anode 54 through the electrolyte layer 56. By contrast, when the rechargeable battery is discharged, lithium ions are extracted from the anode 54, and are inserted into the cathode 53 through the electrolyte layer 56, for example.

The rechargeable battery provided with the gel electrolyte layer 56 is manufactured by the following three kinds of procedures.

In the first manufacturing method, firstly, a cathode 53 and anode 54 are formed according to process steps similar to those for forming the cathode 41 and anode 42 of the aforementioned first rechargeable battery. Specifically, by disposing an active cathode material layer 53B on both sides of the cathode current collector 53A, the cathode 53 is formed; and by disposing an active anode material layer 54B on both sides of the anode current collector 54A, the anode 54 is formed as well. Thereafter, preparing a precursor solution containing a polymer compound and solvent, and coating the thus prepared precursor solution onto the cathode 53 and anode 54, the solvent is subsequently volatilized, whereby the gel electrolyte layers 56 are formed. Next, the cathode lead 51 is attached to the cathode current collector 53A by welding and so forth, while the anode lead 52 is attached to the anode current collector 54A by welding and so forth. Subsequently, by laminating and spirally winding the cathode 53 and anode 54 together with a separator 55 intervening therebetween, a protective tape 57 is adhered to the outermost portion, the spirally wound electrode body 50 is formed. Lastly, after inserting the spirally wound electrode body 50 between two films of outer housing members 60, the outer edge portions of the outer housing members 60 are adhered with each other by fusion bonding and so forth, whereby the spirally wound electrode body 50 is sealed. At this time, the adherence film 61 is inserted between the outer housing member 60 and both cathode lead 51 and anode lead 52. Thereby, the rechargeable battery shown in FIGS. 10 and 11 is completed.

In the second manufacturing method, firstly, the cathode lead 51 is attached to the cathode 53, while the anode lead 52 is attached to the anode 54. Subsequently, after laminating and spirally winding the cathode 53 and anode 54 together with the separator 55 intervening therebetween, and adhering the protective tape 57 to the outermost portion, a spirally wound body is formed as a precursor of the spirally wound electrode body 50. Next, after inserting the spirally wound body between two films of the outer housing members 60, the portion of the outer rim excepting one of the sides thereof is adhered with each other by fusion bonding and so forth, whereby the spirally wound body is contained inside the thus formed pouched outer housing members 60. Subsequently, an electrolyte composition is prepared by including the electrolyte solution, monomers as the material for forming a polymer compound, a polymerization initiator, other materials such as a polymerization inhibitor and so forth, when necessary, the thus prepared electrolyte composition is injected to inside of the pouched outer housing members 60, and the opening of the outer housing members 60 is then sealed by fusion bonding and so forth. Lastly, the monomer is subjected to thermal polymerization to form the polymer compound, whereby the gel electrolyte layer 56 is formed. Thereby, the rechargeable battery is completed.

In the third manufacturing method, firstly, a spirally wound body is formed and then inserted between two film of the pouched outer housing member 60, in a manner similar to the abovementioned second manufacturing method with the exception that a separator 55 is employed, which is formed by having both sides thereof coated with a polymer compound.

As the polymer compound applied to this separator 55, for example, several vinylidene fluoride-based polymers (homopolymers, copolymers, multicomponent copolymers, or the like) are cited. Specifically, these polymers are polyvinylidene fluoride; binary copolymers of vinylidene fluoride and hexafluoropropylene; ternary copolymers of vinylidene fluoride, hexafluoropropylene, and chlorotrifluoroethylene; and so forth. In addition, the polymer compounds may include one kind of, or two or more kinds of polymer compounds in addition to the abovementioned vinylidene fluoride-based polymers. Subsequently, after preparing the electrolyte solution and injecting the thus prepared electrolyte solution to inside of the outer housing member 60, the opening of the outer housing member 60 is sealed by fusion bonding and so forth. Lastly, the outer housing members 60 is applied with load while being heated, and the separator 55 is adhered to the cathode 53 and anode 54 through the polymer compound. As a result, the electrolyte solution is impregnated into the polymer compound, the polymer compound becomes gelled, and the electrolyte layer 56 is formed. Thereby, a rechargeable battery is completed.

With the third manufacturing method, the battery swell can be suppressed more than with the first manufacturing method. In addition, also with the third manufacturing method, since the monomers as polymer raw material, solvent, and so forth are scarcely left behind in the electrolyte layer 56 more than the second manufacturing method, the process for forming the polymer molecules can be controlled satisfactorily. As a result, sufficient adhesion can be obtained between the cathode 53 and anode 54, and the separator 55 and electrolyte layer 56.

According to the second rechargeable battery, since the anode 54 is formed having the composition similar to the aforementioned anodes, the cycle durability can be improved. Other effects with the second rechargeable battery are the same as those with the aforementioned first rechargeable battery.

EXAMPLES

The following specific examples are provided further to illustrate preferred embodiments of the invention.

Examples 1-1 and 1-2

Figure 12:
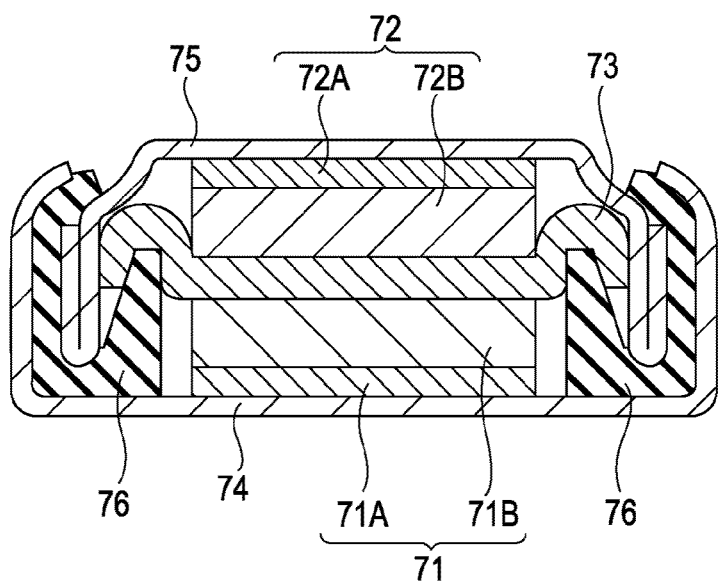
FIG. 12 is a section view schematically illustrating the structure of a coin-type rechargeable battery according to an embodiment of the invention.

According to the following procedures, a coin-type rechargeable battery shown in FIG. 12 was produced. At this time, the rechargeable battery is devised to be a rechargeable lithium-ion battery which is configured such that the capacity of the anode is represented by the insertion and extraction of lithium ions as the electrode reaction substance.

In the first place, a cathode 71 was formed. More specifically, lithium carbonate ($Li_2CO_3$) and cobalt carbonate ($CoCO_3$) were mixed at a molar ratio of 0.5:1, and this mixture was fired in air at 900° C. for 5 hours, whereby lithium cobalt complex oxide ($LiCoO_2$) was formed. Thereafter, 96 parts by weight of lithium cobalt complex oxide (median size=5 μm) as an active cathode material, 1 part by weight of carbon black as a cathode conductive agent, and 3 parts by weight of polyvinylidene fluoride as a cathode binding agent were mixed to form a cathode mixture. Subsequently, the cathode mixture was dispersed into N-methyl-2-pyrrolidone as a solvent to form cathode mixture slurry in paste form. Thereafter, the cathode mixture slurry was coated using a coating machine uniformly on the entire surface of a cathode current collector body 71A made of aluminum foil (thickness=15 μm) and dried afterward, whereby an active cathode material layer 71B was formed. Subsequently, the active cathode material layer 71B was compression molded using a roller press machine. Lastly, the cathode current collector body 71A disposed thereon with the active cathode material layer 71B was stamped out into a pellet shape (circular form) of 15 mm in diameter.

In the next place, the anode 72 is formed. First, as shown in Table 1, an electrolytic copper foil and rolled copper foil (each having the thickness=18 μm) were prepared as current collector bodies. Thereafter, a plurality of conductive particles was formed using the gas flame-spraying method on the entire surface of the current collector body by spraying spherical copper particles in their molten or semi-molten state. In this case, spherical particles and plate-like particles were formed with appropriately adjusting several conditions such as the size of copper particles before melting, the speed of spraying, the distance between a spraying nozzle and a substrate for supporting the current collector body, and so forth. In addition, the spraying process was carried out while cooling the substrate under the flow of carbon dioxide gas such that the current collector body may not suffer from thermal damage. As the gas for generating spraying flames, oxygen gas and hydrogen gas were used, while nitrogen gas was used as spraying gas. At this time, by adjusting the amount of gas for generating spraying flames as to appropriately control spraying temperatures, the surface of the spherical particles and plate-like particles was oxidized and fibrous metal oxides (copper oxides) were formed. As a result, an anode current collector 71A was formed with the current collector body which was disposed on the surface thereof with the plurality of conductive particles (spherical particles and plate-like particles). Thereafter, silicon as an anode substance was deposited on the entire surface of an anode current collector body 72A by the electron beam evaporation method, whereby an active anode substance layer 72B was formed. At this time, the thickness of the active anode substance layer 72B was adjusted to be 6 μm. Lastly, the anode current collector body 72A disposed thereon with the active anode material layer 72B was stamped out into a pellet shape of 16 mm in diameter.

Next, an electrolyte solution was prepared. As a solvent, firstly, ethylene carbonate (EC), vinylene carbonate (VC), and diethyl carbonate (DEC) were mixed. At this time, the composition (EC: VC: DEC) of the solvent was taken to be 30:10:60 by weight ratio. Thereafter, lithium hexafluorophosphate ($LiPF_6$) as electrolyte salt was dissolved in the solvent. In this case, the content of the electrolyte salt was adjusted to 1 mol/kg based on the weight of the solution.

Finally, a rechargeable battery was assembled from the cathode 71 and anode 72 together with the electrolyte solution. First, the cathode 71 was contained inside an outer housing can 74, and the anode 72 was pasted onto an outer housing cup 75. Subsequently, a separator 73 (thickness=23 μm) was impregnated with the electrolyte solution. As the separator 73, a polymer separator was used, which was made of a porous polyethylene film sandwitched with porous polypropylene films. Lastly, after laminating the cathode 71 and anode 72 with the separator 73, which was impregnated with the electrolyte solution, intervening between the cathode and anode, the outer housing can 74 and the outer housing cup 75 were caulked through a gasket 76. Thereby, a coin-type rechargeable battery was completed. When this rechargeable battery was formed, the charge-discharge capacity of the anode 72 was made larger than that of the cathode 71 such that no lithium metal was precipitated out at the time of full charge.

Examples 1-3 and 1-4

As shown in Table 1, the process steps proceeded in a manner similar to those described in the examples 1-1 and 1-2, with the exception that an electrolytic copper foil or rolled copper foil was used as-is for forming the anode current collector.

When the cycle characteristics were investigated for the rechargeable batteries of the examples 1-1 through 1-4, several results were obtained as shown in Table 1.

In the present investigation of the cycle characteristics, the cycle tests were carried out and discharge capacity retention ratios were obtained. Namely, after completing the first charge-discharge cycle in an atmosphere at 23° C. in order to stabilize the battery condition, another charge-discharge cycle was repeated and the discharge capacity value during the second cycle was measured. Subsequently, after completing 99 charge-discharge cycles in the same atmosphere, the discharge capacity value during the 101-th cycle was measured. Thereafter, the discharge capacity retention ratio was calculated from the relationship, discharge capacity retention ratio (%)=(discharge capacity during the 101-th cycle)/(discharge capacity during the second cycle)×100. In this case, after the charging was carried out until the battery voltage reaches 4.2 V with the constant current density 3 $mA/cm^2$, a further charging was carried out until the current density reaches 0.3 $mA/cm^2$ at the constant voltage 4.2 V. In addition, the discharge was carried out until the battery voltage decreased to 2.5 V with the constant current density 3 $mA/cm^2$.

In addition, for each of the rechargeable batteries of the examples 1-1 through 1-4, the ten point height average of irregularities Rz (μm) of the surface of anode current collector body was also investigated. Furthermore, during the cycle tests, the appearance of the anode after the tests was observed visually, and it was examined whether any wrinkle (electrode wrinkle) was generated, which was caused by the expansion and contraction during charge-discharge. These results are also included in Table 1.

The abovementioned procedures and conditions for investigating the cycle characteristics and so forth were proceeded to be the same in the following series of examples as well.

TABLE 1

| | Anode current collector | | | |
|---|---|---|---|---|
| | | Conductive particles | | |
| | Current collector body | Spherical particles | | Plate-like particles | |
| | | Presence/Absence | Material | Presence/Absence | Material |
| Example 1-1 | Electrolytic copper foil | Presence | Cu | Presence | Cu |
| Example 1-2 | Rolled copper foil | Presence | Cu | Presence | Cu |
| Example 1-3 | Electrolytic copper foil | Absence | — | Absence | — |
| Example 1-4 | Rolled copper foil | Absence | — | Absence | — |

| | Anode current collector Ten point height average of irregularities Rz (μm) | Discharge capacity retention ratio (%) | Electrode wrinkle |
|---|---|---|---|
| Example 1-1 | 4.2 | 78 | Absence |
| Example 1-2 | 4.1 | 79 | Absence |
| Example 1-3 | 4.1 | 73 | Presence |
| Example 1-4 | 1.2 | 22 | Presence |

When the plurality of conductive particles (spherical particles and plate-like particles) was formed on the surface of the current collector body, the discharge capacity retention ratio became higher than the case where no conductive particle was formed. Furthermore, although electrode wrinkles occurred in the latter case, no wrinkle was observed in the former case. This result indicates that the adhesion of active anode material layer to anode current collector is increased when the conductive particles contain the spherical particles and plate-like particles, and, as a result, the anode current collector becomes hardly deformed and the active anode material layer becomes also hardly damaged during charge-discharge. Therefore, with the rechargeable batteries of the present invention and by forming the plurality of conductive particles (spherical particles and plate-like particles) on the surface of the current collector body formed of electrolytic copper foil or rolled copper foil, the deformation of the anode can be suppressed and the cycle characteristics are improved as well.

Examples 2-1 Through 2-15

As shown in Table 2, the process steps proceeded in a manner similar to those described in the example 1-1, with the exception that the mean particle size of spherical particles and plate-like particles were changed. In this case, the mean particle size of the spherical particles and plate-like particles was controlled by changing the mean particle size of the copper particles before melting. When cycle characteristics and so forth were investigated for rechargeable batteries of examples 2-1 through 2-15, several results were obtained as included in Table 2.

TABLE 2

| | Anode current collector | | | | |
|---|---|---|---|---|---|
| | Conductive particles | | Ten point | | |
| | Spherical particles Average particle size (μm) | Plate-like particles Average particle size (μm) | height average of irregularities Rz (μm) | Discharge capacity retention ratio (%) | Electrode wrinkle |
| Example 2-1 | 5 | 3 | Absence | 76 | Absence |
| Example 2-2 | | 7 | 4.1 | 77 | Absence |
| Example 1-1 | | 20 | 4.2 | 78 | Absence |
| Example 2-3 | | 35 | 4.2 | 81 | Absence |
| Example 2-4 | | 50 | 4.3 | 82 | Absence |
| Example 2-5 | | 51 | 4.5 | 76 | Absence |
| Example 2-6 | 1 | 2 | 2.8 | 80 | Absence |
| Example 2-7 | | 3 | 2.9 | 80 | Absence |
| Example 2-8 | | 3 | 3.2 | 81 | Absence |
| Example 2-9 | | 3 | 3.1 | 82 | Absence |
| Example 2-10 | | 3 | 3.4 | 83 | Absence |
| Example 2-11 | 10 | 15 | 5.2 | 79 | Absence |
| Example 2-12 | | 25 | 5.4 | 78 | Absence |
| Example 2-13 | | 35 | 6.3 | 77 | Absence |
| Example 2-14 | | 40 | 7.4 | 75 | Absence |
| Example 2-15 | | 50 | 8.5 | 73 | Absence |

Even after changing the mean particle size of the spherical particles and plate-like particles, the occurrence of electrode wrinkles was prevented and high discharge capacity retention ratios were also obtained similarly to the example 1-1. Therefore, with the rechargeable batteries of the present invention, the deformation of the anode can be suppressed and the cycle characteristics are improved as well, independent of the mean particle size of the spherical particles and plate-like particles.

Examples 3-1 Through 3-4

As shown in Table 3, the process steps proceeded in a manner similar to those described in the example 1-1, with the exception that the current collector body was heat-treated, and that the sulfur content and tensile strength were changed. In this case, while maintaining the carbon content to be constant in the current collector body, the sulfur content and tensile strength were controlled by changing heating temperatures applied to the current collector body. When cycle characteristics and so forth were investigated for rechargeable batteries of the examples 3-1 through 3-4, several results were obtained as included in Table 3.

TABLE 3

| | Current collector body | | | | |
|---|---|---|---|---|---|
| | Average crystallite size (μm) | Carbon content (ppm) | Sulfur content (ppm) | Tensile strength (N/mm$^2$) | Discharge capacity retention ratio (%) | Electrode wrinkle |
| Example 3-1 | 3 | 34 | 9 | 458 | 88 | Absence |
| Example 3-2 | | | 35 | 440 | 84 | Absence |
| Example 1-1 | | | 67 | 345 | 78 | Absence |
| Example 3-3 | | | 98 | 364 | 82 | Absence |
| Example 3-4 | | | 101 | 320 | 64 | Absence |

Even after changing the composition and tensile strength of the current collector body, the occurrence of electrode wrinkles was prevented and high discharge capacity retention ratios were also obtained similarly to the example 1-1. Therefore, with the rechargeable batteries of the present invention, the deformation of the anode can be suppressed and the cycle characteristics are improved as well, independent of the composition and physical properties of the current collector body.

Examples 4-1 Through 4-4

As shown in Table 4, the process steps proceeded in a manner similar to those described in the example 1-1, with the exception that the anode was heat-treated. When cycle characteristics and so forth were investigated for rechargeable batteries of the examples 4-1 through 4-4, several results were obtained as included in Table 4.

TABLE 4

| | Anode current collector Heat treatment conditions (° C. for 3 hrs) | Discharge capacity retention ratio (%) | Electrode wrinkle |
|---|---|---|---|
| Example 1-1 | — | 78 | Absence |
| Example 4-1 | 300 | 83 | Absence |
| Example 4-2 | 450 | 84 | Absence |
| Example 4-3 | 600 | 85 | Absence |
| Example 4-4 | 800 | 62 | Presence |

Even after the heat-treatment of the anode, high discharge capacity retention ratios were obtained similarly to the example 1-1. This result indicates that, after providing the heat-treatment of the anode, the adhesion of conductive particles to current collector body is improved, and the adhesion of active anode material layer to anode current collector is increased as well. However, when the current collector body became softened with relative ease when the heat treatment temperature was too high, electrode wrinkles appeared. From these results, it is indicated with the rechargeable batteries of the present invention that the cycle characteristics are further improved by providing the anode with heat-treatment. In this case, when the temperature of the heat treatment is set lower than the softening temperature of the current collector body, the deformation of the anode can be suppressed and the cycle characteristics are improved as well.

Examples 5-1 and 5-2

As shown in Table 5, the process steps proceeded in a manner similar to those described in the example 1-1, with the exception that the surface roughness (ten point height average of irregularities Rz (μm)) of the anode was changed. In this case, by subjecting the surface of the current collector body (electrolytic copper foil) to the blast processing, the surface roughness of the body was changed and the roughness of the surface of the anode current collector was controlled as a result. When cycle characteristics and so forth were investigated for rechargeable batteries of the examples 5-1 and 5-2, several results were obtained as included in Table 5.

TABLE 5

| | Anode current collector Ten point height average of irregularities Rz (μm) | Discharge capacity retention ratio (%) | Electrode wrinkle |
|---|---|---|---|
| Example 1-1 | 4.2 | 78 | Absence |
| Example 5-1 | 4.4 | 81 | Absence |
| Example 5-2 | 5.1 | 83 | Absence |

Even after changing the surface roughness of the current collector body and anode current collector, the occurrence of electrode wrinkles was prevented and high discharge capacity retention ratios were also obtained similarly to the example 1-1. From these results, therefore, with the rechargeable batteries of the present invention, the deformation of the anode can be suppressed and the cycle characteristics are improved as well, independent of the surface roughness of the current collector body and anode current collector.

Examples 6-1 Through 6-3

As shown in Table 6, the process steps proceeded in a manner similar to those described in the example 1-1, with the exception that the method for forming the active anode material layer was changed. In the case where the sputtering method (RF magnetron sputtering method) was used, silicon of 99.99% of purity was employed as a sputtering target and the deposition speed was adjusted to be 0.5 nm/sec. In the case where the CVD method was used, silane (SiH$_4$) was employed as a raw material, and argon (Ar) was employed as an excitation gas. In the case where the spraying method was used, silicon powders (median size=1 to 300 μm) were employed as melting material and the spraying speed was adjusted to 45 to 55 m/sec as well. Other conditions during spraying were similar to those for forming the conductive particles described earlier in the example 1-1. When cycle characteristics and so forth were investigated for rechargeable batteries of the examples 6-1 through 6-3, several results were obtained as included in Table 6.

TABLE 6

| | Active anode material layer Forming method | Discharge capacity retention ratio (%) | Electrode wrinkle |
|---|---|---|---|
| Example 1-1 | Electron beam evaporation method | 78 | Absence |
| Example 6-1 | Sputtering method | 79 | Absence |
| Example 6-2 | CVD method | 75 | Absence |
| Example 6-3 | Spraying method | 83 | Absence |

Even after changing the method for forming the active anode material layer, the occurrence of electrode wrinkles was prevented and high discharge capacity retention ratios were also obtained similarly to the example 1-1. From these results, therefore, with the rechargeable batteries of the present invention, the deformation of the anode can be suppressed and the cycle characteristics are improved as well, independent of the method for forming the active anode material layer.

Examples 7-1 Through 7-5

As shown in Table 7, the process steps proceeded in a manner similar to those described in the example 1-1, with the exception that the composition of the electrolyte solution was changed. In this case, there employed as a solvent was either 4-fluoro-1,3-dioxolane-2-on (FEC) or 4,5-difluoro-1,3-dioxolane-2-on (DFEC). As an additional solvent, either sulfobenzoic acid anhydride (SBAH) or sulfopropionic acid anhydride (SPAH) was employed. As an electrolyte salt, lithium tetrafluoroborate ($LiBF_4$) was employed. As to the additional solvent, after mixing several solvents, this additional solvent was added such that a predetermined composition was obtained based on the mixed solvents. When cycle characteristics and so forth were investigated for rechargeable batteries of examples 7-1 through 7-5, several results were obtained as included in Table 7.

TABLE 7

| | Electrolyte Solvent (weight %) | | | | |
|---|---|---|---|---|---|
| | EC | VC | FEC | DFEC | DEC |
| Example 1-1 | 30 | 10 | — | — | 60 |
| Example 7-1 | — | — | 50 | — | 50 |
| Example 7-2 | 30 | — | — | 5 | 65 |
| Example 7-3 | 30 | — | — | 5 | 65 |
| Example 7-4 | 30 | — | — | 5 | 65 |
| Example 7-5 | 30 | — | — | 5 | 65 |

| | Electrolyte | | | Discharge | |
|---|---|---|---|---|---|
| | Other solvent (weight %) | electrolyte salt (mol/kg) | | capacity retention ratio (%) | Electrode wrinkle |
| | | $LiPF_6$ | $LiBF_4$ | | |
| Example 1-1 | — | 1 | — | 78 | Absence |
| Example 7-1 | — | 1 | — | 79 | Absence |
| Example 7-2 | — | 1 | — | 79 | Absence |
| Example 7-3 | SBAH | 1 | — | 81 | Absence |
| Example 7-4 | SPAH | 1 | — | 81 | Absence |
| Example 7-5 | — | 0.9 | 0.1 | 82 | Absence |

Even after changing the composition of the electrolyte solution, the occurrence of electrode wrinkles was prevented and high discharge capacity retention ratios were also obtained similarly to the example 1-1. In this case, by adding FEC and so forth as the solvent, SBAH and so forth as the additional solvent, and $LiBF_4$ as the electrolyte salt, the discharge capacity retention ratios were further increased. From these results with the rechargeable batteries of the present invention, it is indicated that the deformation of the anode can be suppressed and the cycle characteristics are improved as well, independent of the composition of the electrolyte solution.

While the present invention has been described hereinabove with reference to the preferred embodiments and specific examples, the forgoing description is intended to be illustrative but not limiting, and numerous modifications and alterations of the examples may therefore be possible. For example, the application of the anode and current collector disclosed in the present invention is not necessarily limited to rechargeable batteries, but the applications to other electrochemical devices may also be feasible. As these applications, capacitors and so forth may be cited.

In addition, while the lithium-ion batteries have been primarily related as the class of the rechargeable battery in the above-mentioned embodiments and examples, the present invention is not necessarily limited thereto. Namely, the rechargeable battery of the invention may also be applied to a rechargeable battery which is devised such that the capacity of its anode includes the capacity represented by the insertion and extraction of lithium ions and the further capacity represented by the precipitation and dissociation of lithium metal, and that the overall capacity is represented by the sum of these two capacities. In this case, the battery is devised such that the anode material, which is capable of inserting and extracting lithium ions, is used as the active anode material, and the electrifiable capacity of the anode material is smaller than the discharge capacity of the cathode.

In addition, in the abovementioned embodiments and examples, while the structure of the battery has been described as cylinder type, laminate type, or coin type, and the battery elements have been described to have the spirally wound structure, the present invention is not necessarily limited thereto. That is, the rechargeable battery of the invention may also be applied similarly to the case of battery structure of square or button shape, or alternatively to the case of layered structure of battery elements as well.

Still in addition, while the case of employing lithium has been described as the element participating in the electrode reaction in the above-mentioned embodiments and examples, the present invention is not necessarily limited thereto. Namely, examples of the element participating in the electrode reaction may further include Group 1 elements other than lithium, such as sodium (Na), potassium (K), and so forth; Group 2 elements such as magnesium, calcium, and so forth; and light metals such as aluminum and so forth. From the results mentioned above, the operations and effects of the present invention can also be expected independent of the kind of the electrode reaction material.

The present application contains subject matter related to that disclosed in Japanese Priority Patent Application JP 2009-056457 filed in the Japan Patent Office on Mar. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A rechargeable battery, comprising:
a cathode capable of inserting and extracting an electrode reaction material;
an anode capable of extracting and inserting the electrode reaction material, the anode comprising an anode current collector and an active material layer on the current collector; and
an electrolyte,
wherein,
the anode current collector comprises (i) a current collector body, and (ii) a plurality of conductive particles disposed on a surface of the current collector body,
the plurality of conductive particles includes a plurality of spherical particles and a plurality of plate-like particles, and at least some of the plate-like particles are formed bent in a section of the anode current collector, which section intersects the surface of the current collector body, such that end portions of the particles, in a direction of extension, extend away from the surface of the current collector body.

2. The rechargeable battery according to claim 1, wherein at least some of the plurality of plate-like particles are formed by being extended in a direction along the surface of the current collector body.

3. The rechargeable battery according to claim 1, wherein the spherical particles overlie the plate-like particles on the surface of the anode current collector body.

4. The rechargeable battery according to claim 1, wherein some of the plurality of plate-like particles at least partially overlap with each other on the surface of the anode current collector body.

5. The rechargeable battery according to claim 1, wherein the spherical particles and the plate-like particles are metal particles and metal oxides are on the spherical particles and the plate-like particles.

6. The rechargeable battery according to claim 5, wherein the metal oxides are substantially fibrous in shape.

7. The rechargeable battery according to claim 1, wherein the spherical particles and the plate-like particles are formed by a spraying method.

8. The rechargeable battery according to claim 1, wherein each of the current collector body and the conductive particles include copper (Cu).

9. The rechargeable battery according to claim 1, wherein the active anode material layer includes silicon (Si).

10. The rechargeable battery according to claim 1, wherein the active anode material layer is formed by a gas phase method.

11. The rechargeable battery according to claim 1, wherein the electrode reaction material is a lithium ion.

12. An anode, comprising:
    an anode current collector including a current collector body; and
    an active anode material layer on the anode current collector,
    wherein,
        a plurality of conductive particles are on a surface of the current collector body,
        the plurality of conductive particles includes a plurality of spherical particles and a plurality of plate-like particles, and
        at least some of the plate-like particles are formed bent in a section of the anode current collector, which section intersects the surface of the current collector body, such that end portions of the particles, in a direction of extension, extend away from the surface of the current collector body.

13. A current collector, comprising a current collector body;
    wherein:
        the current collector is provided with a plurality of conductive particles on a surface of the current collector body,
        the plurality of conductive particles includes a plurality of spherical particles and a plurality of plate-like particles, and
        at least some of the plate-like particles are formed bent in a section of the anode current collector, which section intersects the surface of the current collector body, such that end portions of the particles, in a direction of extension, extend away from the surface of the current collector body.

* * * * *